US 9,103,994 B2

(12) United States Patent
Jones et al.

(10) Patent No.: US 9,103,994 B2
(45) Date of Patent: Aug. 11, 2015

(54) OPTICAL FIBER GUIDE APPARATUSES FOR SPLICE CONNECTOR INSTALLATION TOOLS, AND RELATED ASSEMBLIES AND METHODS

(75) Inventors: Ashley W. Jones, Denton, TX (US);
Daniel Leyva, Jr., Arlington, TX (US);
Michael G. Thornton, Jr., Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 287 days.

(21) Appl. No.: 13/362,501

(22) Filed: Jan. 31, 2012

(65) Prior Publication Data

US 2013/0195416 A1    Aug. 1, 2013

(51) Int. Cl.
| | |
|---|---|
| *G02B 6/00* | (2006.01) |
| *G02B 6/36* | (2006.01) |
| *G02B 6/255* | (2006.01) |
| *G02B 6/38* | (2006.01) |
| *G02B 6/44* | (2006.01) |

(52) U.S. Cl.
CPC ............ *G02B 6/3803* (2013.01); *G02B 6/3897* (2013.01); *G02B 6/4439* (2013.01); *G02B 6/3801* (2013.01)

(58) Field of Classification Search
CPC .......... G02B 6/00; G02B 6/2555; G02B 6/38; G02B 6/3801; G02B 6/3803; G02B 6/3806; G02B 6/3897; G02B 6/4439
USPC ............. 385/55–56, 76–78, 95–99, 134–139; 264/1.24–1.26; 29/428
See application file for complete search history.

(56) References Cited

U.S. PATENT DOCUMENTS

| | | | |
|---|---|---|---|
| 1,139,152 | A | 5/1873 | Hettinger |
| 4,413,763 | A | 11/1983 | Lukas |
| 4,621,754 | A | 11/1986 | Long et al. |
| 4,627,561 | A | 12/1986 | Balyasny et al. |
| 4,674,666 | A | 6/1987 | Balyasny |
| 4,681,398 | A | 7/1987 | Bailey et al. |

(Continued)

FOREIGN PATENT DOCUMENTS

| | | |
|---|---|---|
| DE | 3313013 A1 | 10/1984 |
| DE | 9316137 U1 | 12/1993 |

(Continued)

OTHER PUBLICATIONS

European Patent Office Search Report, Application No. 13152502.4-1562, May 7, 2013, 9 pages.

(Continued)

*Primary Examiner* — Akm Enayet Ullah
*Assistant Examiner* — Michael Mooney

(57) ABSTRACT

Optical fiber guide apparatuses for splice connector installation tools, and related assemblies and methods are disclosed. The optical fiber guide apparatus may include at least one alignment member to align an optical fiber guide with a splice connector installation tool. The optical fiber guide is configured to guide an optical fiber to a fiber entry of a fiber optic connector installed in the splice connection installation tool. In this manner, when the alignment member is alignably interfaced with the splice connector installation tool, the optical fiber guide apparatus is also aligned with the splice connector installation tool to accurately guide the optical fiber to the fiber optic connector installed in the splice connector installation tool.

28 Claims, 17 Drawing Sheets

(56) References Cited

U.S. PATENT DOCUMENTS

| | | | |
|---|---|---|---|
| 4,688,707 A | 8/1987 | Szostak et al. | |
| 4,755,018 A | 7/1988 | Heng et al. | |
| 4,923,274 A | 5/1990 | Dean | |
| 4,930,827 A | 6/1990 | Tihansky | |
| 5,031,321 A | 7/1991 | Briscoe | |
| 5,040,867 A | 8/1991 | de Jong et al. | |
| 5,108,021 A | 4/1992 | Vines | |
| 5,125,549 A | 6/1992 | Blackman et al. | |
| 5,261,020 A | 11/1993 | De Jong et al. | 385/76 |
| 5,301,868 A | 4/1994 | Edwards et al. | |
| 5,394,496 A | 2/1995 | Caldwell et al. | |
| 5,408,558 A | 4/1995 | Fan | |
| 5,524,350 A | 6/1996 | Boland | |
| 5,668,902 A | 9/1997 | Kurata | |
| 6,099,392 A | 8/2000 | Wiegand et al. | |
| 6,173,097 B1 | 1/2001 | Throckmorton et al. | |
| 6,202,310 B1 | 3/2001 | Linden | |
| 6,379,054 B2 | 4/2002 | Throckmorton et al. | |
| 6,439,780 B1 | 8/2002 | Mudd et al. | 385/83 |
| 6,467,667 B1 | 10/2002 | Durian et al. | |
| 6,601,199 B1 | 7/2003 | Fukuda et al. | |
| 6,816,661 B1 | 11/2004 | Barnes et al. | 385/134 |
| 6,901,199 B2 | 5/2005 | Tabeling | |
| 6,931,193 B2 | 8/2005 | Barnes et al. | |
| 7,070,078 B2 | 7/2006 | Song | |
| 7,116,882 B2 | 10/2006 | Watte et al. | |
| 7,280,733 B2 | 10/2007 | Larson et al. | 385/139 |
| 7,756,381 B2 | 7/2010 | Bleus et al. | |
| 8,622,270 B2 | 1/2014 | Barnes et al. | |
| 8,678,260 B2 | 3/2014 | Barnes et al. | |
| 2002/0003158 A1 | 1/2002 | Nakae | |
| 2002/0023356 A1 | 2/2002 | Skinner et al. | |
| 2002/0150372 A1 | 10/2002 | Schray | |
| 2002/0179666 A1 | 12/2002 | Buckley et al. | |
| 2003/0113087 A1 | 6/2003 | Lee et al. | |
| 2004/0099121 A1 | 5/2004 | Itano et al. | |
| 2004/0228596 A1 | 11/2004 | Tabeling | |
| 2007/0047897 A1 | 3/2007 | Cooke et al. | |
| 2008/0019646 A1 | 1/2008 | DeJong | 385/99 |
| 2008/0166094 A1 | 7/2008 | Bookbinder et al. | |
| 2008/0187278 A1 | 8/2008 | Young | 385/134 |
| 2008/0240666 A1 | 10/2008 | Brinson et al. | |
| 2008/0247710 A1 * | 10/2008 | Oike et al. | 385/78 |
| 2009/0169163 A1 | 7/2009 | Abbott, III et al. | |
| 2009/0252460 A1 | 10/2009 | Ohtsuka et al. | 385/81 |
| 2010/0163593 A1 | 7/2010 | Song et al. | |
| 2010/0187276 A1 | 7/2010 | Ohmura et al. | |
| 2010/0301503 A1 | 12/2010 | Schratz et al. | 264/1.26 |
| 2011/0079930 A1 | 4/2011 | Saito et al. | 264/1.25 |
| 2011/0150409 A1 | 6/2011 | Childers et al. | 385/137 |

FOREIGN PATENT DOCUMENTS

| | | | |
|---|---|---|---|
| EP | 2375270 A2 | 10/2011 | G02B 6/36 |
| GB | 2046242 A | 11/1980 | |
| SU | 920012 A1 | 4/1982 | |
| WO | 2008134507 A1 | 11/2008 | |
| WO | 2009051918 A1 | 4/2009 | |

OTHER PUBLICATIONS

Notice of Allowance for U.S. Appl. No. 12/541,637, mailed Mar. 13, 2012, 7 pages.

Final Office Action for U.S. Appl. No. 12/541,637, mailed Jan. 5, 2012, 7 pages.

Non-final Office Action for U.S. Appl. No. 12/541,637, mailed Sep. 14, 2011, 7 pages.

European Search Report for European patent application No. 08014476.9, mailed Nov. 5, 2008, 5 pages.

Non-final Office Action for U.S. Appl. No. 13/112,434, mailed Aug. 20, 2013, 11 pages.

Final Office Action for U.S. Appl. No. 13/112,434, mailed Feb. 14, 2014, 14 pages.

Advisory Action for U.S. Appl. No. 13/112,434, mailed May 8, 2014, 3 pages.

Non-final Office Action for U.S. Appl. No. 13/112,434, mailed Jun. 20, 2014, 19 pages.

Non-final Office Action for U.S. Appl. No. 13/115,228, mailed Jan. 8, 2014, 9 pages.

Final Office Action for U.S. Appl. No. 13/115,228, mailed Jun. 12, 2014, 10 pages.

International Search Report for PCT/US2011/061756 mailed Feb. 23, 2012, 4 pages.

International Preliminary Report on Patentability for PCT/US2011/061756 mailed Jun. 6, 2013, 6 pages.

Final Office Action for U.S. Appl. No. 13/112,434 mailed Dec. 15, 2014, 19 pages.

* cited by examiner

OPTICAL FIBER GUIDE APPARATUSES FOR SPLICE CONNECTOR INSTALLATION TOOLS, AND RELATED ASSEMBLIES AND METHODS

RELATED APPLICATION

This application is related to U.S. patent application Ser. No. 13/362,474, filed on even date herewith and titled "Detachable Optical Fiber Guides For Splice Connector Installation Tools, and Related Assemblies and Methods," which is incorporated herein by reference in its entirety.

BACKGROUND

1. Field of the Disclosure

The technology of the disclosure relates to terminating fiber optic mechanical splice connectors to an optical fiber, and more particularly, to a splice connector installation tool and fiber optic mechanical splice connectors containing stub optical fibers.

2. Technical Background

Optical fibers are useful in a wide variety of applications, including the telecommunications industry. Optical fibers can be employed for voice, data and video transmissions. With the ever increasing and varied use of optical fibers, apparatus and methods have been developed for coupling optical fibers to one another outside a controlled environment of a factory setting, commonly referred to as "field installation" or "in the field." Examples of "field installations" include a telephone central office, an office building, and outside plant terminals. In order to efficiently couple optical signals transmitted by the optical fibers, a fiber optic connector must not significantly attenuate, reflect, or otherwise alter the optical signals. In addition, fiber optic connectors for coupling optical fibers must be relatively rugged and adapted to be connected and disconnected a number of times in order to accommodate changes such as moves, adds or changes in the optical transmission path that may occur over time.

Although fiber optic connectors are efficiently and reliably mounted upon the end portion of an optical fiber in a factory setting, it is often desirable to install fiber optic connectors in the field. In other words, the end user can install the fiber optic connector on the end portion of an optical fiber in the field. Installing fiber optic connectors in the field can advantageously minimize cable lengths and optimize cable management and routing. In this regard, installation tools have been developed to facilitate the splice termination of one or more optical fibers to a fiber optic connector, and particularly, to enable the splice termination of one or more field optical fibers to a mechanical splice connector. Examples of conventional installation tools for performing mechanical splices in the field are described in U.S. Pat. Nos. 5,040,867; 5,261,020; 6,816,661; and 6,931,193. In particular, U.S. Pat. Nos. 6,816,661 and 6,931,193 describe a UNICAM® installation tool available from Corning Cable Systems LLC of Hickory, N.C., designed specifically to facilitate mounting the UNICAM® family of fiber optic connectors upon the end portions of one or more field optical fibers.

FIGS. 1A and 1B respectively illustrate an exemplary field-installable, mechanical splice fiber optic connector 10 (also referred to as "mechanical splice connector" and "fiber optic connector 10") suitable for use with the installation tool before and after termination. The fiber optic connector 10 may be a member of the UNICAM® family of mechanical splice connectors. As shown in FIGS. 1A and 1B, the mechanical splice connector 10 includes a connector ferrule 12 defining a lengthwise, longitudinal bore for receiving and securing a stub optical fiber 14 in a known manner, such as by an adhesive. The forward end 16 (also referred to herein as the "end face") of the ferrule 12 is typically precision polished such that the stub optical fiber 14 is flush with (as shown) or slightly protruding from the end face 16 of the ferrule 12. The rear end 18 of the ferrule 12 is inserted into and secured within the forward end of a ferrule holder 20 so that the stub optical fiber 14 extends rearwardly a predetermined distance from the ferrule 12 between a pair of opposed splice components 22, 24 disposed within the ferrule holder 20. In turn, the ferrule holder 20, including the ferrule 12 and splice components 22, 24, are disposed within a connector housing 26.

With continuing reference to FIGS. 1A and 1B, a cam member 28 is movably mounted to the ferrule holder 20 and the connector housing 26 for engaging a keel portion of the lower splice component 24. If desired, the ferrule 12, the ferrule holder 20 and the cam member 28 may be biased relative to the connector housing 26, for example by a coil spring 30, to ensure physical contact between the end face 16 of the ferrule 12 and the end face of an opposing ferrule in a mating fiber optic connector or optical device (not shown). Finally, a spring retainer 32 may be disposed between the connector housing 26 and a medial portion of the cam member 28 and fixed to the connector housing 26 so as to retain one end of the spring 30 relative to the connector housing 26. As a result, the ferrule 12, the ferrule holder 20 and the cam member 28 are biased forwardly, yet permitted to piston rearwardly relative to the connector housing 26.

To make a splice within a connector, a field optical fiber 34 is inserted into a rear end of the ferrule holder 20 opposite the ferrule 12 and the stub optical fiber 14 as illustrated by the horizontal directional arrow $A_H$ in FIG. 1A. Typically, the field optical fiber 34 is coated or tight-buffered with a buffer 36 that is stripped back to expose a predetermined length of the end of the field optical fiber 34. The mechanical splice connector 10 may be further provided with a crimp tube 38 including a fiber entry 40. The crimp tube 38 retains and strain relieves the buffer 36 of the field optical fiber 34. With a portion of the buffer 36 removed, the field optical fiber 34 can be inserted and advanced into the rear of the mechanical splice connector 10 between the splice components 22, 24 until the end portion of the field optical fiber 34 makes physical contact with the end portion of the stub optical fiber 14. Thereafter, the cam member 28 is actuated by moving or rotating the cam member 28 relative to the ferrule holder 20 about the longitudinal axis of the connector 10, to engage the keel on the splice component 24 and thereby force the lower splice component 24 in the direction of the upper splice component 22. Movement of the lower splice component 24 causes the end portion of the stub optical fiber 14 and the end portion of the field optical fiber 34 to seat within the V-shaped groove formed in the lower splice component 24, thereby aligning and securing the field optical fiber 34 relative to the stub optical fiber 14 between the splice components. Accordingly, the field optical fiber 34 is optically coupled to the stub optical fiber 14 as a mechanical splice for transmitting an optical signal between the field optical fiber 34 and the stub optical fiber 14.

To make an acceptable mechanical splice, a clean and undamaged optical fiber 34 should be inserted into the fiber optic connector 10 for achieving a satisfactory termination with the stub optical fiber 14 within the connector. A conventional practice is to insert the optical fiber 34 manually within the fiber optic connector 10 in the installation tool by aligning the optical fiber 34 with a crimp tube 38 of the fiber optic connector 10. This conventional practice is generally sufficient for highly-trained and experienced technicians; however, less experience technicians may lack the know-how and/or have difficulty make high-quality terminations in the field. Moreover, the conventional practice typically includes re-cleaving a damaged optical fiber 34 and/or cleaning optical fibers 34 contaminated with debris when the optical fibers 34 are not properly inserted in the fiber optic connector 10 on the first attempt. In other words, depending on the skill, eyesight, and dexterity of the technician, as well as ambient light, alignment and insertion of the optical fiber 34 in the fiber optic connector 10 may require more than one attempt. Consequently, there is an unresolved need for devices and methods that provide high-quality terminations in the field by the technician.

SUMMARY OF THE DETAILED DESCRIPTION

Embodiments disclosed herein include optical fiber guide apparatuses for splice connector installation tools, and related assemblies and methods. The optical fiber guide apparatuses may include at least one alignment member to align an optical fiber guide with a splice connector installation tool. The optical fiber guide is configured to guide an optical fiber to a fiber entry of a fiber optic connector installed in the splice connection installation tool. In this manner, when the alignment member is alignably interfaced with the splice connector installation tool, the optical fiber guide apparatus is also aligned with the splice connector installation tool to accurately guide the optical fiber to the fiber optic connector installed in the splice connector installation tool.

In this regard in one embodiment, an optical fiber guide apparatus is disclosed. The optical fiber apparatus is configured to guide a field optical fiber (hereinafter "optical fiber") into a fiber optic connector installed (i.e., held) within a splice connector installation tool. The optical fiber guide apparatus includes a fiber guide body having a fiber guide disposed in the fiber guide body. The fiber guide comprises a recess defining an entry opening and an exit opening opposite the entry opening along a longitudinal axis of the fiber guide. The recess may be configured to receive and guide an optical fiber from the entry opening along the longitudinal axis of the fiber guide through the exit opening into a housing opening of the splice connector installation tool. The optical fiber guide apparatus may also include an alignment member disposed in the fiber guide body. The alignment member is configured to be alignably interfaced with a movable clamp in the splice connector installation tool. The movable clamp may be configured to clamp an end portion of a fiber optic connector within the housing opening of the splice connector installation tool to align the end portion with the exit opening of the fiber guide. In this manner, as a non-limiting example, the optical fiber may be alignably inserted within the fiber optic connector without damage or with reduced risk of damage to the optical fiber.

In another embodiment, an optical fiber termination system is disclosed. The optical fiber termination system includes a splice connector installation tool having a housing forming an internal cavity. The splice connector installation tool may also include a mechanical device at least partially disposed within the internal cavity. The mechanical device may be configured to perform a splice termination of an optical fiber with a stub optical fiber of a fiber optic connector. The optical fiber termination system also includes an optical fiber guide apparatus having a fiber guide body with a fiber guide disposed in the fiber guide body. The fiber guide may comprise a recess defining an entry opening and an exit opening opposite the entry opening along a longitudinal axis of the fiber guide. The recess may be configured to receive and guide an optical fiber from the entry opening along the longitudinal axis of the fiber guide through the exit opening into a housing opening of a splice connector installation tool. The optical fiber guide apparatus may also include an alignment member that may alignably interface with a movable clamp that may be attached to the splice connector installation tool. The movable clamp may clamp an end portion of a fiber optic connector within the housing opening to align the end portion with the exit opening of the fiber guide. In this manner, as a non-limiting example, the optical fiber may be inserted into the fiber optic connector with minimal damage.

In another embodiment, a method for splicing an optical fiber to a stub optical fiber in a fiber optic connector is disclosed. The method includes providing a splice connector installation tool including a housing forming an internal cavity and a mechanical device at least partially disposed within the internal cavity. The method may also include providing an optical fiber guide apparatus comprising a fiber guide body. The fiber guide apparatus may also include a fiber guide disposed in the fiber guide body. The fiber guide may include a recess defining an entry opening and an exit opening opposite the entry opening along a longitudinal axis of the fiber guide. The optical fiber guide apparatus may also include an alignment member. The method may then include aligning the exit opening of the fiber guide in a direction relative to the splice connector installation tool with the alignment member by alignably interfacing the alignment member with a moveable clamp attached to the splice connector installation tool as the movable clamp clamps an end portion of a fiber optic connector. The method may then include receiving an optical fiber into the entry opening and guiding the optical fiber along the longitudinal axis of the fiber guide through the exit opening into a housing opening of the splice connector installation tool. The method may then include terminating the optical fiber to the stub optical fiber of the fiber optic connector using the mechanical device. In this manner, as a non-limiting example, the optical fiber may be inserted into the fiber optic connector quickly and with minimal operator skill required.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include optical fiber guide apparatuses for splice connector installation tools, and related assemblies and methods. The optical fiber guide apparatuses may include at least one alignment member to align an optical fiber guide with a splice connector installation tool. The optical fiber guide is configured to guide an optical fiber to a fiber entry of a fiber optic connector installed in the splice connection installation tool. In this manner, when the alignment member is alignably interfaced with the splice connector installation tool, the optical fiber guide apparatus is also aligned with the splice connector installation tool to accurately guide the optical fiber to the fiber optic connector installed in the splice connector installation tool.

Figure 1A:
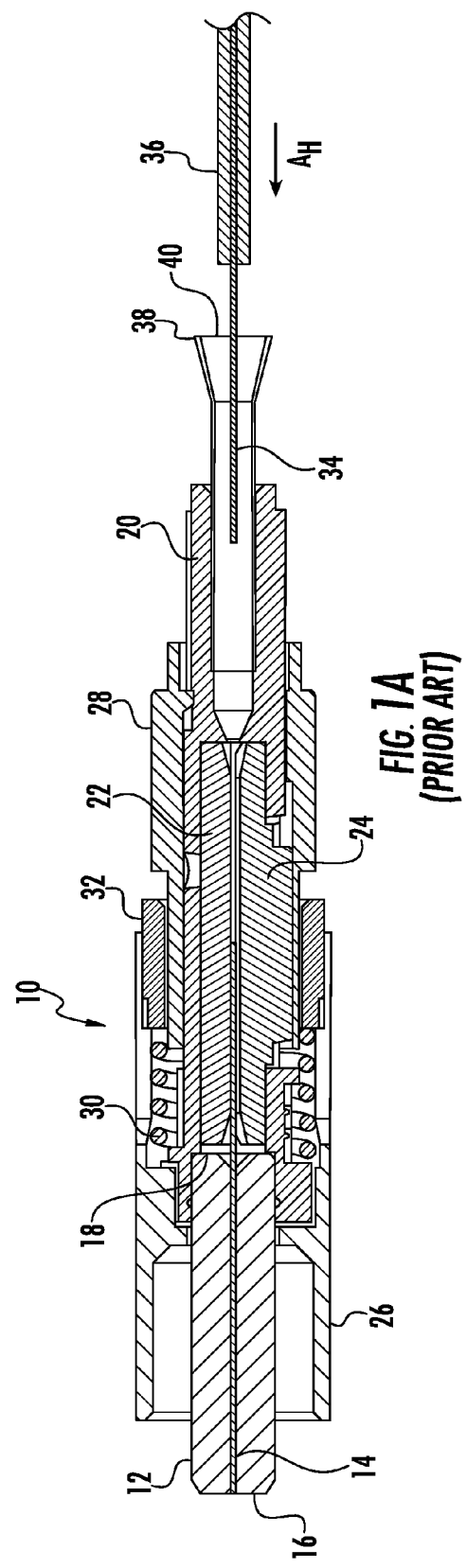
FIG. 1A is a side cutaway view of an exemplary optical fiber prior to termination with a stub optical fiber of an exemplary prior art mechanical splice fiber optic connector.
Figure 1B:
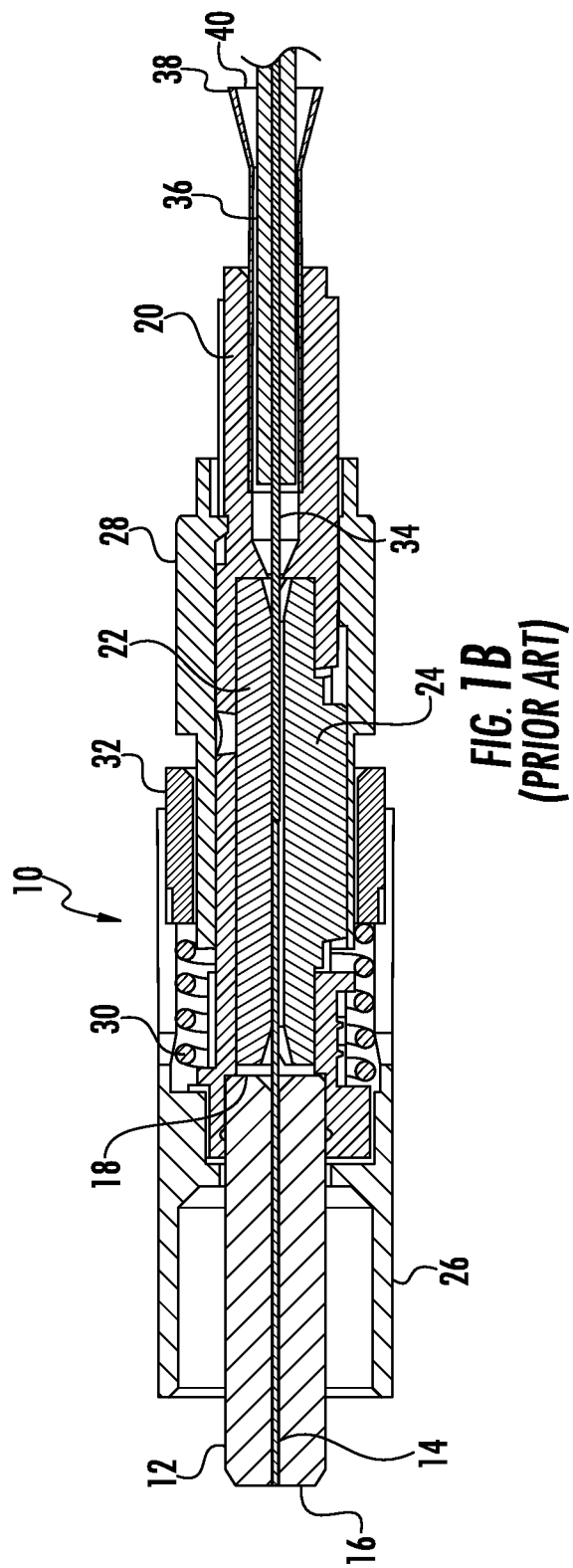
FIG. 1B is a side cutaway view of the optical fiber terminated with the stub optical fiber of the prior art mechanical splice fiber optic connector of FIG. 1A.
Figure 2A:
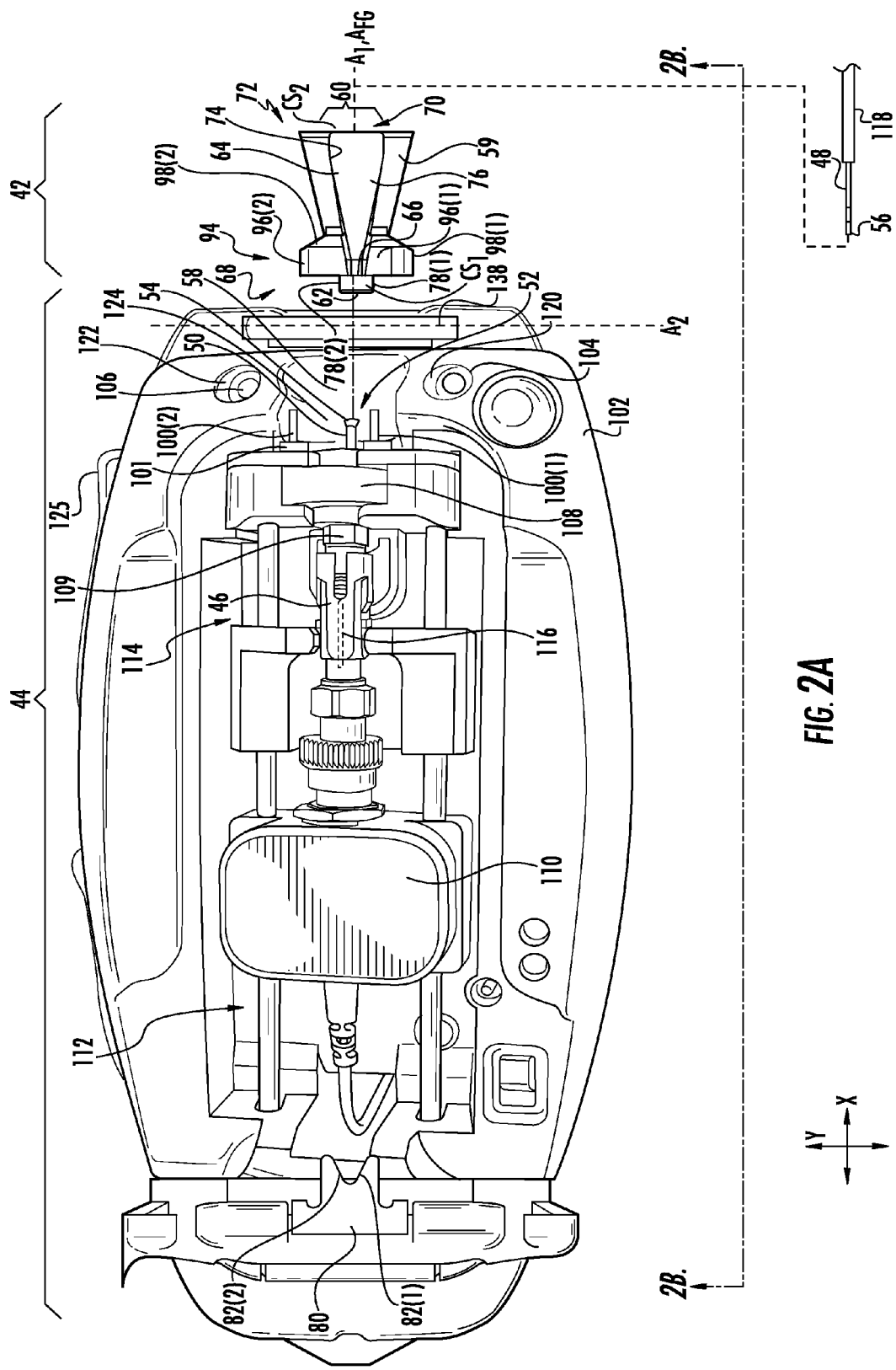
FIG. 2A is a top view of an exemplary fiber optic connector installed in an exemplary splice connector installation tool adjacent to an exemplary optical fiber guide apparatus.

In this regard, FIG. 2A is a top view of an exemplary optical fiber guide apparatus 42 configured to align an optical fiber 48 with a splice connector installation tool 44. The optical fiber guide apparatus 42 is shown as being adjacent to the splice connector installation tool 44. A fiber optic connector 46 is installed in the splice connector installation tool 44 to be terminated to the optical fiber 48 inserted through the optical fiber guide apparatus 42. In this explanatory embodiment, the splice connector installation tool 44 is useful for the UniCam® field-installable connector commercially available from Corning Cable Systems, LLC of Hickory, N.C. As will be discussed in more detail below, the optical fiber guide apparatus 42 is configured to interface with the splice connector installation tool 44 to align a fiber guide with the fiber optic connector 46 to facilitate alignably inserting an optical fiber 48 into the fiber optic connector 46 for a splice connection.

With continuing reference to FIG. 2A, in one non-limiting embodiment the fiber optic connector 46 disposed in the splice connector installation tool 44 may include a crimp tube 50 at an end portion 52 of the fiber optic connector 46. The crimp tube 50 may include a fiber entry 54 serving as a passageway for an end 56 of the optical fiber 48 to be inserted within the fiber optic connector 46 in order to be terminated to the fiber optic connector 46. In other embodiments, the end portion 52 of the fiber optic connector 46 may include the fiber entry 54 serving as a passageway, but may not include the crimp tube 50. The insertion of the optical fiber 48 may occur in a housing opening 58 of the splice connector installation tool 44 where the end portion 52 of the fiber optic connector 46 may be located, when the fiber optic connector 46 is installed in the splice connector installation tool 44. The fiber optic connector 46 may be removed from the splice connector installation tool 44 once a termination with the optical fiber 48 is completed. The fiber optic connector 46 can thereafter be connected as desired to optically couple the optical fiber 48 terminated by fiber optic connector 46 to another optical fiber or other optical device.

The optical fiber guide apparatus 42 may include various features observable in FIG. 2A including a fiber guide body 59, a fiber guide 60, and an alignment member 62. The fiber guide 60 is disposed in the fiber guide body 59. The fiber guide 60 of the optical fiber guide apparatus 42 is configured to guide the optical fiber 48 into the fiber optic connector 46 when the optical fiber guide apparatus 42 is interfaced with the splice connector installation tool 44. As will be discussed in more detail below, the alignment member 62 is in a known fixed relationship with the fiber guide 60 of the optical fiber guide apparatus 42. The splice connector installation tool 44 also includes a movable clamp, introduced below, that is configured to control the alignment of the end portion 52 of the fiber optic connector 46. Thus, because the alignment member 62 in the optical fiber guide apparatus 42 alignably interfaces with the movable clamp of the splice connector installation tool 44, the alignment member 62 aligns the fiber guide 60 with the end portion 52 of the fiber optic connector 46. This allows for aligned insertion of the optical fiber 48 in the fiber entry 54 of the end portion 52 of the fiber optic connector 46 for a splice connection.

Before discussing the alignment member 62 and the alignment features of the optical fiber guide apparatus 42 in more detail, the optical fiber guide apparatus 42 and its fiber guide 60 will be discussed. The fiber guide 60 in FIG. 2A is disposed in the fiber guide body 59. The fiber guide body 59 may be configured to connect the fiber guide 60 to other features in the optical fiber guide apparatus 42, for example, the alignment member 62. With continuing reference to FIG. 2A, the fiber guide 60 in this embodiment may include a recess 64 defining an exit opening 66 having a first cross-sectional area $CS_1$ and disposed on a first end 68 of the fiber guide 60. The fiber guide 60 may also include an entry opening 70 having a second cross-sectional area $CS_2$ larger than the first cross-sectional area $CS_1$. The entry opening 70 may be disposed on a second end 72 of the fiber guide 60 opposite the exit opening 66 along a longitudinal axis $A_{FG}$ of the fiber guide 60. This may enable a distance to be created between the entry opening 70 and the exit opening 66 to make possible a gradual change in cross-sectional area of the recess 64.

With continuing reference to FIG. 2A, the recess 64 of the fiber guide 60 may be configured to receive and guide the optical fiber 48 from the entry opening 70 along the longitudinal axis $A_{FG}$ and through the exit opening 66 into the housing opening 58. The recess 64 provides a passageway for the optical fiber 48 to travel through the optical fiber guide apparatus 42. The recess 64 may include one or more recess surfaces 74 arranged at a desired angle from the longitudinal axis $A_{FG}$. For instance, the desired angle between recessed surface 74 longitudinal axis $A_{FG}$ may be disposed at an angle of less than twenty (20) degrees from the longitudinal axis $A_{FG}$ in one example, but other angles are possible. The recess surfaces 74 may be disposed, for example, within fifteen (15) degrees of the longitudinal axis $A_{FG}$ to reduce debris by reducing the potential for the optical fiber 48 to be lodged in the recess surfaces 74 when the optical fiber 48 may contact the recess surfaces 74 as the optical fiber 48 travels through the recess 64. The recess surfaces 74 may include a bottom recess surface portion 76 disposed up to four (4) degrees of the longitudinal axis $A_{FG}$ or preferably up to two (2) degrees, as non-limiting examples. Of course, other angles for the bottom recess surface portion 76 are possible. The recess surfaces 74 may guide the optical fiber 48 along the recess 64.

The optical fiber guide apparatus 42 may further include the alignment member 62 to align the exit opening 66 of the optical fiber guide apparatus 42 with the end portion 52 of the fiber optic connector 46. The alignment member 62 enables the exit opening 66 of the fiber guide 60 and the end portion 52 of the fiber optic connector 46 to be aligned with each other in a second axis $A_2$. The second axis $A_2$ may be orthogonal to a longitudinal axis $A_1$ of the splice connector installation tool 44. As will be discussed in more detail below, the alignment member 62 aligns the fiber guide 60 with the end portion 52 of the fiber optic connector 46 using a movable clamp. The alignment member 62 may include two surfaces 78(1), 78(2). Each of the two surfaces 78(1), 78(2) adapted to move the alignment member 62 in opposite directions along the second axis $A_2$.

The two surfaces 78(1), 78(2) may be on opposite sides of the alignment member 62. This orientation on opposite sides of the alignment member 62 may improve the access of the movable clamp 80 to the two surfaces 78(1), 78(2) during alignment. The two surfaces 78(1), 78(2) also may be angled with respect to each other to taper the alignment member 62. The tapering may improve the ability of the movable clamp 80 to make contact with the alignment member 62 during alignment. The alignment member 62 may alignably interface with a movable clamp 80 of the splice connector installation tool 44. The two surfaces 78(1), 78(2) of the alignment member 62 may abut against movable surfaces 82(1), 82(2) of the movable clamp 80 when the alignment member 62 alignably interfaces with the movable clamp 80. Abutment and/or centering of the two surfaces 78(1), 78(2) against the movable surfaces 82(1), 82(2) indicates the alignment member 62 has completed alignment relative to the second axis $A_2$. The two surfaces 78(1), 78(2) may abut to the movable clamp 80 concurrently or not depending on the design.

Figure 2B:
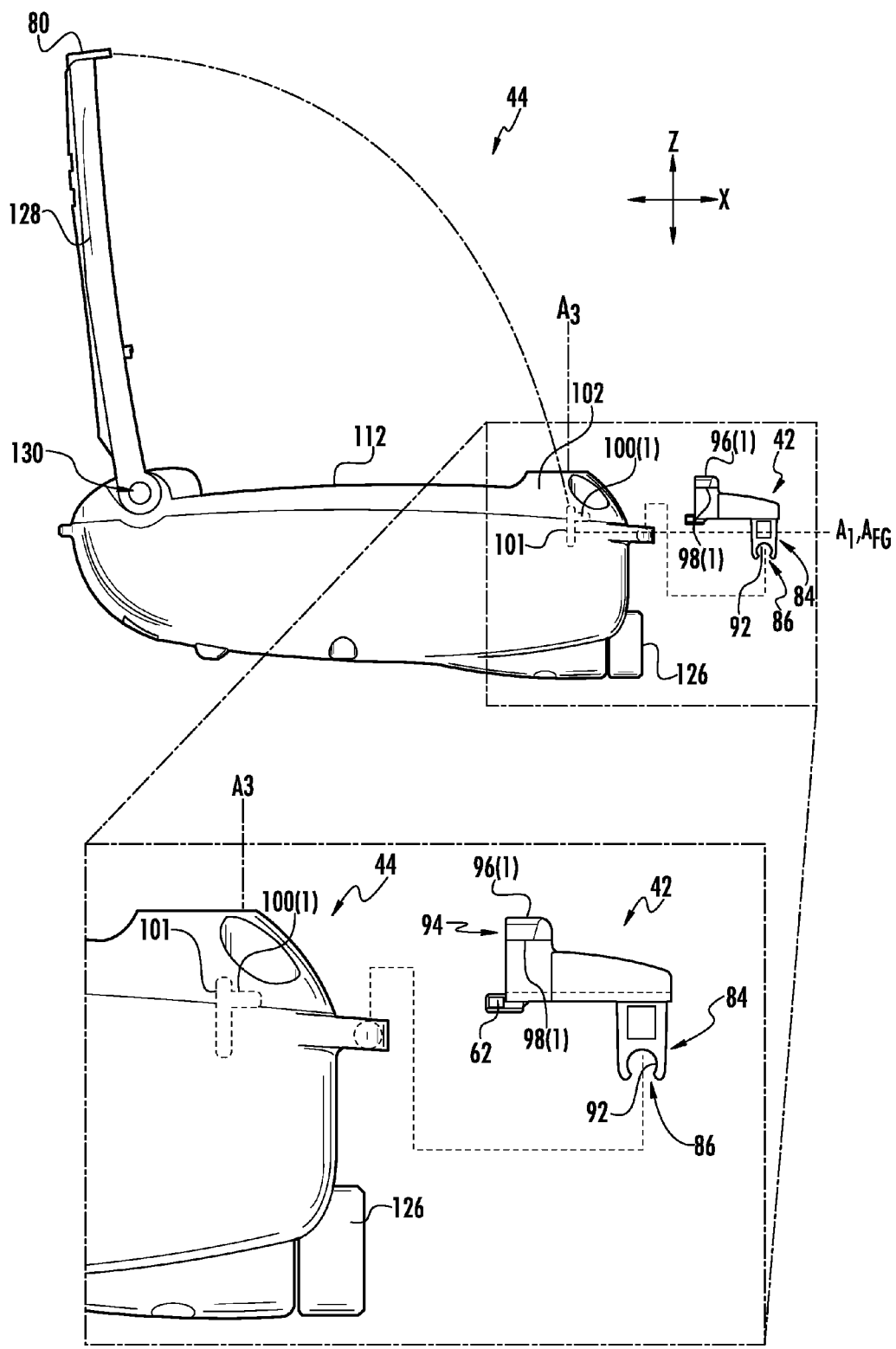
FIG. 2B is a side view of the splice connector installation tool of FIG. 2A with the fiber optic connector removed along with a detail view.
Figure 4A:
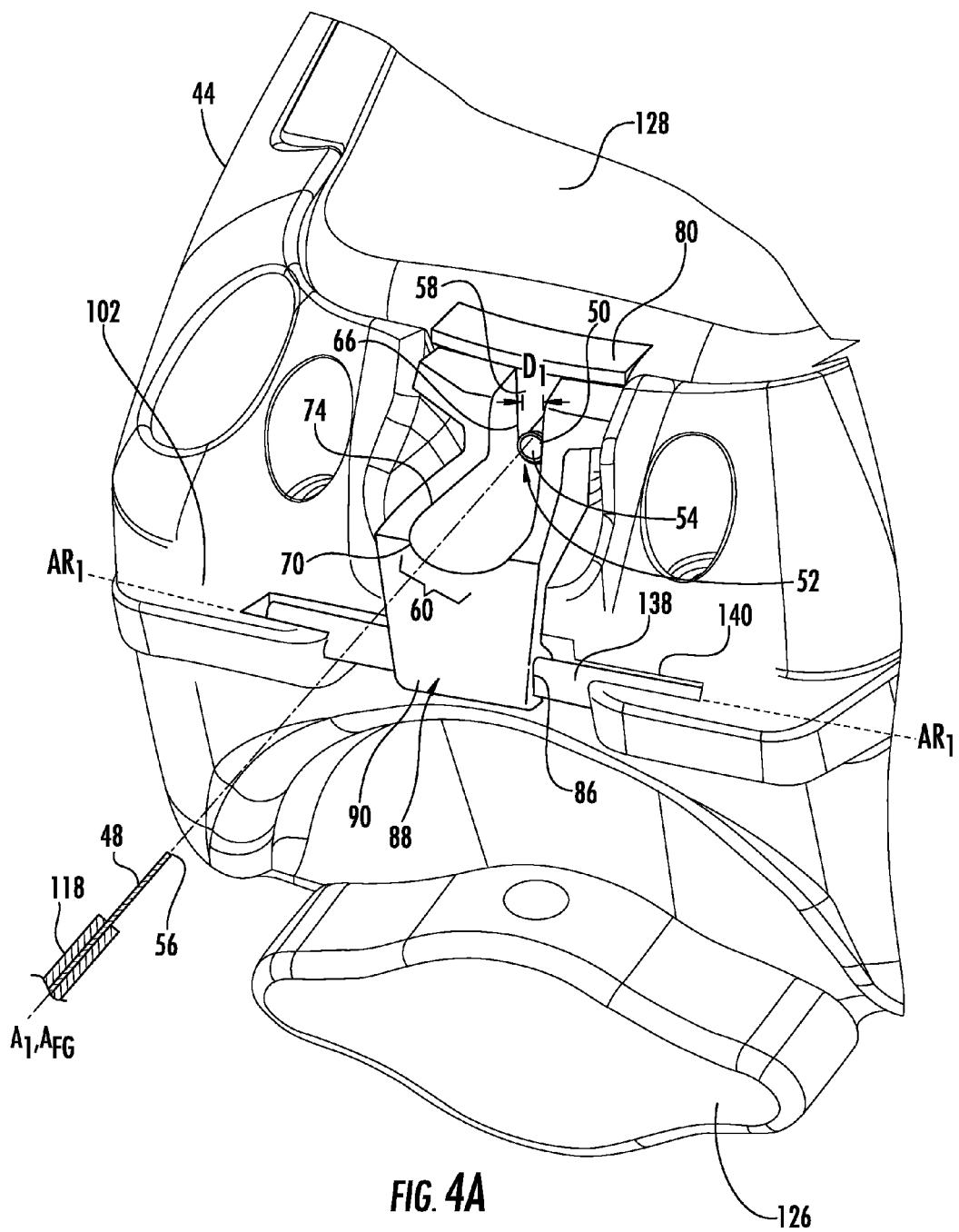
FIG. 4A is a perspective front top view of the fiber optic connector and optical fiber guide apparatus installed in the splice connector installation tool of FIG. 2A with the optical fiber aligned with a fiber entry of the fiber optic connector.

As illustrated in FIG. 2B, the optical fiber guide apparatus 42 may also include a second alignment member 84. The second alignment member 84 may be employed to limit a position of the exit opening 66 of the fiber guide 60 along the longitudinal axis $A_1$ of the splice connector installation tool 44. In this regard, the position of the exit opening 66 may be limited to a fixed distance from an axis of rotation $AR_1$ of a rotatable attachment 88 (FIG. 4A). Thereby the exit opening 66 may be restricted from preventing the movement of the movable clamp 80. Further, a distance between the exit opening 66 and the end portion 52 of the fiber optic connector 46 may be minimized to better guide the optical fiber 48 into the fiber entry 54 of the end portion 52. The second alignment member 84 may comprise a clip feature 86 which may form the rotatable attachment 88 with the splice connector installation tool 44. The rotatable attachment 88 may be a slidable pivot attachment 90 or have any other suitable configuration. The clip feature 86 may include a concave surface 92 (FIG. 2B) configured to form the slidable pivot attachment 90. The clip feature 86 provides a convenient and tool-less attachment to the splice connector installation tool 44.

With continuing reference to FIGS. 2A and 2B, the optical fiber guide apparatus 42 may further include a third alignment member 94 configured to position the exit opening 66 of the fiber guide 60 along a third axis $A_3$ (FIG. 2B). Thereby the exit opening 66 may be more accurately guided to fiber entry 54 of the end portion 52 of the fiber optic connector 46 with respect to the third axis $A_3$. The third axis $A_3$ may be orthogonal to the longitudinal axis $A_1$ of the splice connector installation tool 44 and orthogonal to the second axis $A_2$. The third alignment member 94 may include brackets 96(1), 96(2). The brackets 96(1), 96(2) may include alignment surfaces 98(1), 98(2) to align the exit opening 66 of the fiber guide 60 along the third axis $A_3$ by abutting against reference surfaces 100(1), 100(2) attached to the splice connector installation tool 44. In one embodiment shown in FIG. 2A, the reference surfaces 100(1), 100(2) may also be attached to a structural member 101 attached within the splice connector installation tool 44. The structural member 101 may provide a more accurate reference point than a movable component of the splice connector installation tool 44. The alignment surfaces 98(1), 98(2) are preferably symmetrical about the longitudinal axis $A_{FG}$ of the fiber guide 60, but symmetry is not required. This arrangement allows the optical fiber guide apparatus 42 to be supported on opposite sides of the longitudinal axis $A_{FG}$ to improve accuracy. In summary, the plurality of alignment members 62, 84, 94 provides enhanced alignment of the exit opening 66 in multiple axes $A_1$; $A_2$ and $A_3$ with respect to the splice connector installation tool 44 and the end portion 52 of the fiber optic connector 46.

As discussed above, the optical fiber guide apparatus 42 may be attached to the splice connector installation tool 44. Some non-limiting features of the splice connector installation tool 44 which appear in FIG. 2A may include the housing 102, termination status indicators such as unacceptable termination signal 104 or acceptable termination signal 106, cam actuator 108, and a visual fault locator system 110. The housing 102 may form an internal cavity 112 within which a mechanical device 114 and the visual fault locator system 110 may be disposed.

The mechanical device 114 may be utilized to perform a splice termination of the end 56 of the optical fiber 48 with a stub optical fiber 116 of a fiber optic connector 46. The optical fiber 48 may include a buffer 118 for protection and/or stress isolation or not depending on the cable and/or connector design. When the splice termination of the optical fiber 48 and the stub optical fiber 116 is completed, then the optical fiber 48 and the stub optical fiber 116 are optically coupled by way of a mechanical splice. The cam actuator 108 twists a portion of the fiber optic connector 46 called a cam member 109 of the fiber optic connector 46 to perform the splice termination. FIG. 2A depicts the splice connector installation tool 44 with the fiber optic connector 46 installed in solid lines and the stub optical fiber 116 (internal) of the fiber optic connector 46 in phantom lines.

Determining whether a termination of an optical fiber 48 has been properly performed is important. In this embodiment, the visual fault locator system 110 discussed above may be located in the internal cavity 112. The visual fault locator system 110 determines whether the splice termination is properly performed. The visual fault locator system 110 may comprise one or more optical lenses and light sensors to determine if the quality and intensity of light conveyed between the optical fiber 48 and the stub optical fiber 116 meet performance specifications. The unacceptable termination signal 104 or the acceptable termination signal 106 (i.e., termination status indicators) may be illuminated by the visual fault locator system 110 to communicate whether the splice termination is properly performed. The unacceptable termination signal 104 and the acceptable termination signal 106 may be located in a first recess 120 and second recess 122 respectively within the housing 102. These locations are easily monitored by an operator due to their prominent placements on the housing 102.

With continuing reference to FIGS. 2A and 2B, the housing 102 of the splice connector installation tool 44 may also include a housing recess 124 forming the housing opening 58 to enable the optical fiber 48 to be inserted into the fiber entry 54. The fiber entry 54 may have a width $D_1$ (FIG. 4A). In one embodiment, the width $D_1$ may be two (2) millimeters, as a non-limiting example, but other suitable width sizes are possible. The splice connector installation tool 44 may include a splice activation handle 125 to be engaged to initiate optical coupling between the optical fiber 48 and the stub optical fiber 116 such as by rotating cam actuator 108. As shown in FIG. 2B, the splice connector installation tool 44 may include an actuator control knob 126 to deform the crimp tube of the fiber optic connector 46 after an acceptable termination signal 106 is received if desired. Access and operation of the actuator control knob 126 may continue when the optical fiber guide apparatus 42 is attached to the splice connector installation tool 44. In other words, the optical fiber guide apparatus 42 does not impede operation of installation tool 44.

FIG. 2B shows an embodiment of the splice connector installation tool 44 including the movable clamp 80. In this embodiment, the movable clamp 80 is attached to a lid 128, but other arrangements are possible. The lid 128 may be able to rotate relative to the housing 102 through a pivot 130 attachable to the housing 102. As discussed above, the movable clamp 80 is configured to alignably interface with the alignment member 62 and to clamp the end portion 52 of the fiber optic connector 46 to align the exit opening 66 of the fiber guide 60 with the end portion 52 in the second axis $A_2$. The movable clamp 80 has a V-shaped structure including the movable surfaces 82(1), 82(2) allowing precise alignment of the exit opening 66 of the fiber guide 60 relative to the end portion 52 in the second axis $A_2$, as will be discussed in more detail below. The pivot 130 enables the lid 128 to be opened to allow access to the internal cavity 112 of the splice connector installation tool 44 to attach or detach the fiber optic connector 46. The lid 128 may also be moved to a closed, or nearly closed position, to interface with the alignment member 62. The lid 128 may also be closed when the splice connector installation tool 44 is not in use to protect the mechanical device 114.

Figure 3A:
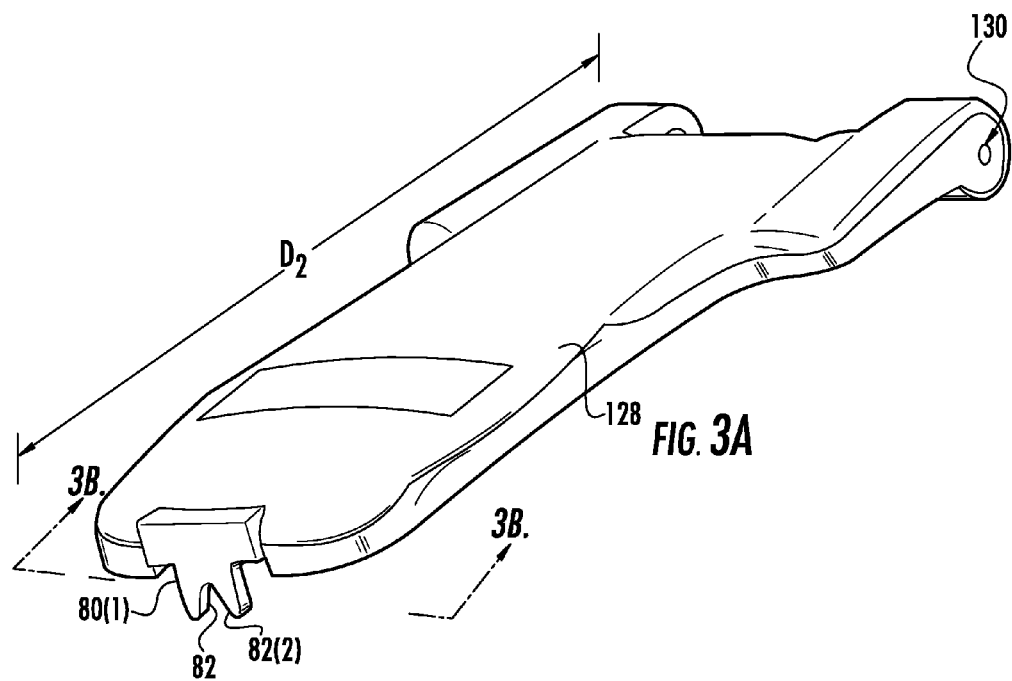
FIGS. 3A and 3B are top perspective and front views, respectively, of an exemplary movable clamp attached to an exemplary lid.
Figure 3B:
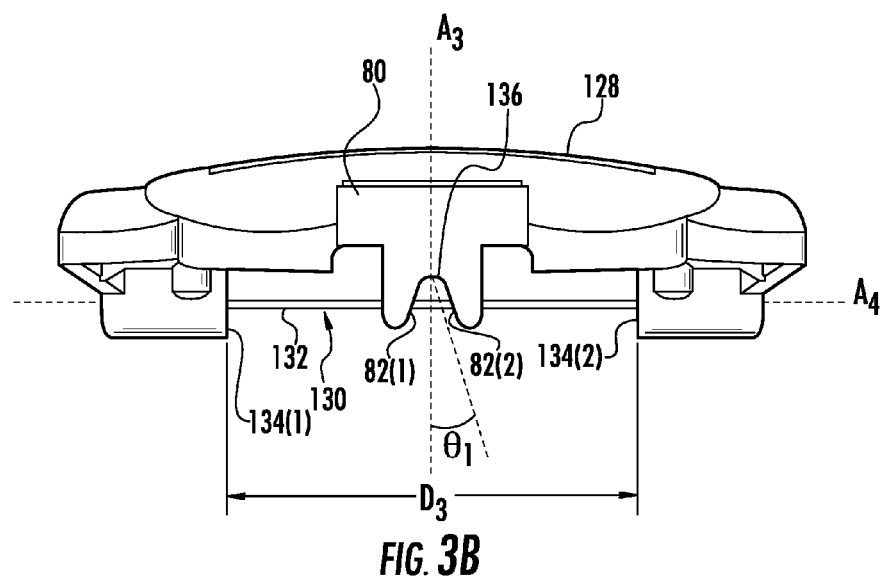

FIGS. 3A and 3B show details of the lid 128 and movable clamp 80 when the pivot 130 is detached from the housing 102 of the splice connector installation tool 44. The lid 128 extends a distance $D_2$ from the pivot 130 to the movable clamp 80. The pivot 130 may be an axle 132 as shown in FIG. 3B that may be inserted through holes (not shown) in the housing 102. In one embodiment, the axle 132 may be removable, and may extend between two retainer surfaces 134(1), 134(2). The two retainer surfaces 134(1), 134(2) may face each other and may abut against the housing 102 to prevent the lid 128 from translating along a fourth axis $A_4$ of the pivot 130. The fourth axis $A_4$ may be parallel to the second axis $A_2$, as shown in this embodiment.

The movable clamp 80 may be attached orthogonally or substantially orthogonally to the lid 128. The movable surfaces 82(1), 82(2) of the movable clamp 80 may be angled with respect to each other and may extend from a lid apex surface 136. The angle between the movable surfaces 82(1), 82(2) converts a portion of a force $F_0$ of the lid 128 in the third axis $A_3$ to forces $F_1$, $F_2$ in the second axis $A_2$ as described in more detail below. A portion of each of the movable surfaces 82(1), 82(2) may be up to an angle $\theta_1$, which may, in non-limiting embodiments, be in a range from zero (0) to forty-five (45) degrees, and in the embodiment shown the angle is about twenty-two (22) degrees. The lid 128, the axle 132, and the movable clamp 80 may be made of one or more strong resilient materials, for example, plastic or metal.

Figure 3C:
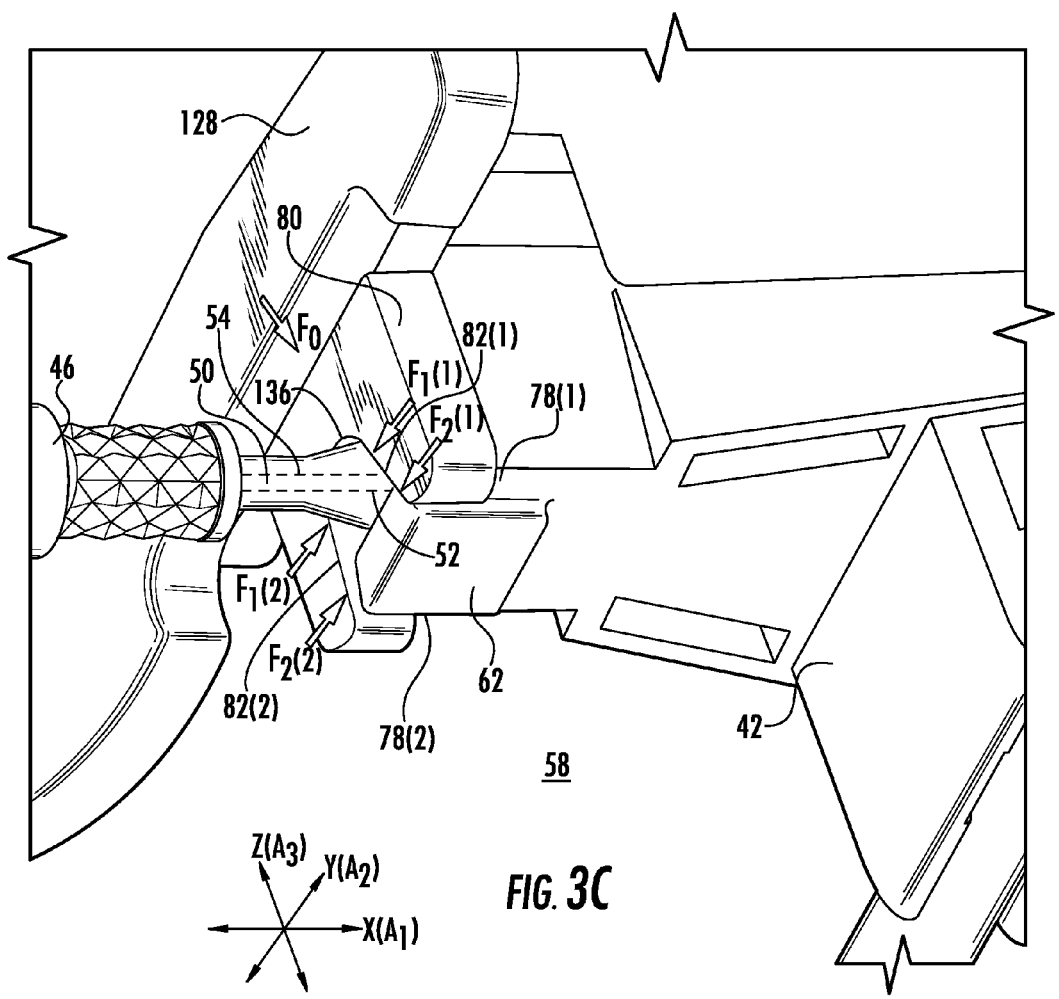
FIG. 3C is a perspective view of the movable clamp of FIGS. 3A and 3B clamping an end portion of the fiber optic connector installed in the splice connector installation tool of FIG. 2A, the movable clamp being alignably interfaced with an adjustment member of the optical fiber guide apparatus of FIG. 2A.

FIG. 3C depicts a partial view of the movable surfaces 82(1), 82(2) of the movable clamp 80 clamping down on the end portion 52 of the fiber optic connector 46 as the lid 128 is rotated in the third axis $A_3$ to a closed or near closed position. FIG. 3C is a partial view because the structural member 101 and the reference surfaces 100(1), 100(2) have been removed for clarity. The fiber optic connector 46 may move in a horizontal direction (X and/or Y direction) relative to the splice connector installation tool 44 when installed within the splice connector installation tool 44. As the lid 128 is rotated, at least one of the movable surfaces 82(1), 82(2) of the movable clamp 80 may come into contact with the end portion 52 of the fiber optic connector 46 to create the one or more forces $F_1(1)$, $F_1(2)$, respectively, from the force $F_0$ of the lid 128 in the third axis $A_3$ upon the end portion 52 as shown in FIG. 3C. The forces $F_1(1)$, $F_1(2)$ may move the fiber optic connector 46 in the horizontal direction (X and/or Y direction) as the lid 128 is rotated until the end portion 52 is clamped by the lid apex surface 136 as shown in FIG. 3C. The end portion 52 is aligned to the movable clamp 80 when the end portion 52 is clamped by the lid apex surface 136 and thereby is aligned with the second axis $A_2$.

While the movable clamp 80 is clamping down on the end portion 52 of the fiber optic connector 46, the movable clamp 80 is alignably interfacing with the alignment member 62 of the optical fiber guide apparatus 42. Alignably interfacing occurs as the lid 128 is rotated and at least one of the movable surfaces 82(1), 82(2) abut against the two surfaces 78(1), 78(2) of the alignment member 62 to create one or more forces $F_2(1)$, $F_2(2)$, respectively, from the force $F_0$ of the lid 128 in the third axis $A_3$ upon the alignment member 62 as shown in FIG. 3C. The forces $F_2(1)$, $F_2(2)$ may move the alignment member 62 in a horizontal direction (X and/or Y direction) as the lid 128 is rotated until the end portion 52 of the fiber optic connector 46 is clamped by the lid apex surface 136 as shown in FIG. 3C or when at least two of the movable surfaces 82(1), 82(2) abut against the two surfaces 78(1), 78(2) of the alignment member 62. As a result of the alignably interfacing, the exit opening 66 of the fiber guide 60 is aligned along the second axis $A_2$ with the fiber entry 54 of the end portion 52 because the exit opening 66 is a fixed spatial relationship relative to the alignment member 62.

In other words, the optical fiber guide apparatus 42 includes two surfaces 78(1), 78(2) which are configured to interface with the movable clamp 80 that also directly interfaces with the end portion 52 of the fiber optic connector 46. As the movable clamp 80 couples directly to the end portion 52 and the fiber guide apparatus, direct coupling alignment between the two is provided and can overcome a variance in the location of the end portion 52 of the fiber optic connector 46 within the splice connector installation tool 44.

In some embodiments, the end portion 52 of the fiber optic connector 46 may not abut against the alignment member 62. Not having the end portion 52 abut against the alignment member 62 may enable the fiber optic connector 46 to be more easily installed in the splice connector installation tool 44. Further, in embodiments of the fiber optic connector 46 where the end portion 52 includes the crimp tube 50, the crimp tube 50 is more accessible to be crimped to the buffer 118 of the optical fiber 48 in order to more strongly mechanically attach the optical fiber 48 to the fiber optic connector 46.

FIG. 4A shows a perspective view of the optical fiber guide apparatus 42 attached to the splice connector installation tool 44 with a rotatable attachment 88 and the end portion 52 of the fiber optic connector 46 aligned with the exit opening 66. The rotatable attachment 88 occurs between the concave surface 92 (FIG. 2B) of the clip feature 86 and a pin 138 of the splice connector installation tool 44. The pin 138 serves as a static attachment location on the splice connector installation tool 44 for the optical fiber guide apparatus 42. The pin 138 may be attached to the housing 102 of the splice connector installation tool 44 by, for example, an interference fit with a recess 140 of the housing 102. The pin 138 may be made of a strong resilient material, for example, metal or plastic. In one non-limiting embodiment, the pin 138 may have a suitable diameter for securing the optical fiber guide apparatus 42, for example, of one-eighth of an inch.

The pin 138 may be a cylindrical shape to enable the concave surface 92 of the clip feature 86 to clip onto the pin 138 and form the rotatable attachment 88. The rotatable attachment 88 may include the axis of rotation $AR_1$ about a center axis of the pin 138. In one embodiment, the clip feature 86 may be toollessly clipped onto and removed from the pin 138. The clip feature 86 of the optical fiber guide apparatus 42 may be made of a strong flexible material, for example, plastic, to enable attachment to the pin 138.

Moreover, the concave surface 92 may translate along the pin 138 parallel to the axis of rotation $AR_1$ to form the slidable pivot attachment 90. The translation enables the optical fiber guide apparatus 42 to move parallel to the second axis $A_2$ when the forces $F_2(1)$, $F_2(2)$ are applied as shown in FIG. 3C.

Figure 4B:
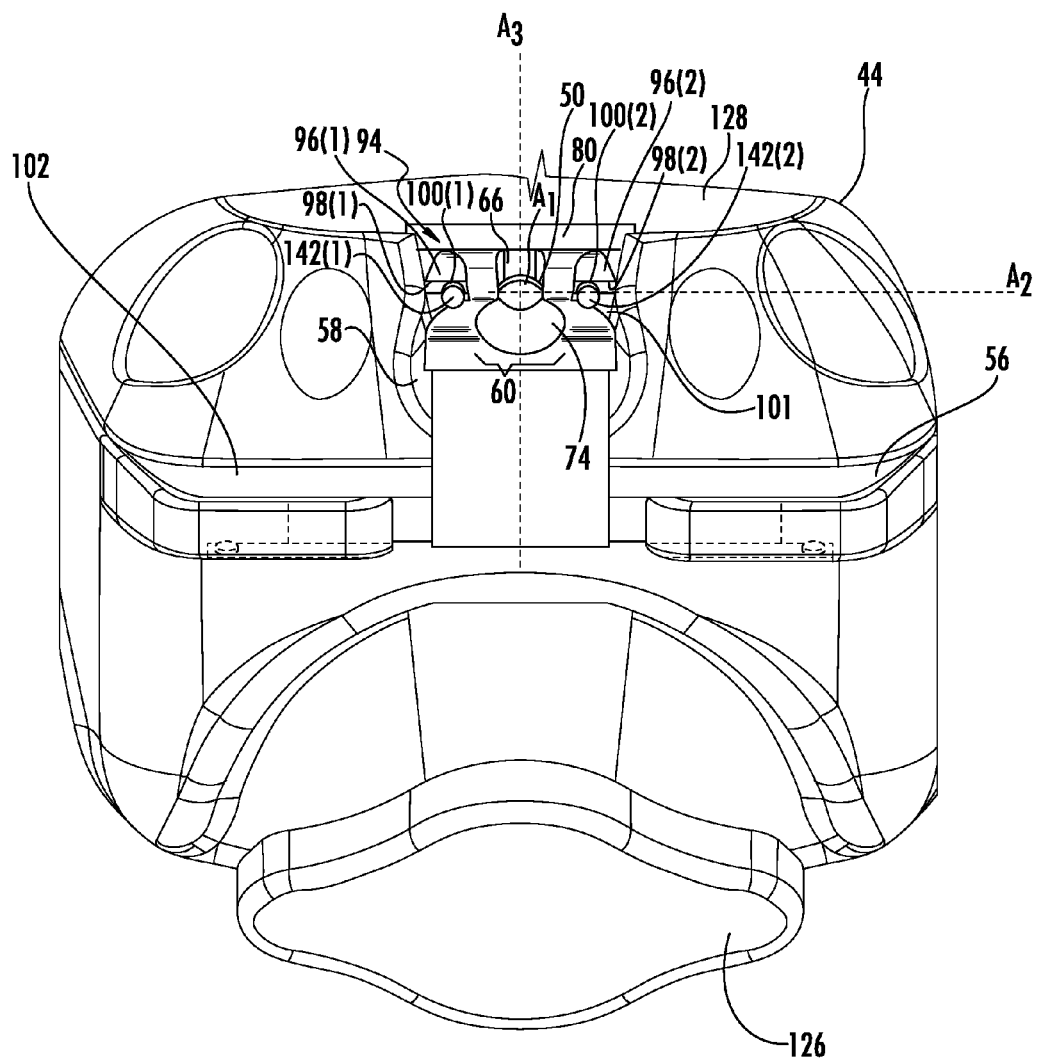
FIG. 4B is a front view of the fiber optic connector and optical fiber guide apparatus installed in the splice connector installation tool of FIG. 2A.

FIG. 4B depicts the third alignment member 94 aligning the exit opening 66 of the fiber guide 60 along a third axis $A_3$. The third axis $A_3$ may be orthogonal to the longitudinal axis $A_1$ of the splice connector installation tool 44 and orthogonal to the second axis $A_2$. The third alignment member 94 includes the alignment surfaces 98(1), 98(2) aligning the exit opening 66 of the fiber guide 60 along the third axis $A_3$ by abutting against the reference surfaces 100(1), 100(2) attached as part of the splice connector installation tool 44. The alignment surfaces 98(1), 98(2) may be included as part of the brackets 96(1), 96(2) which may extend from the fiber guide 60. The reference surfaces 100(1), 100(2) may be disposed on cantilevered pins 142(1), 142(2) of the splice connector installation tool 44 which is disposed within the housing opening 58. In one non-limiting embodiment, the cantilevered pins 142(1), 142(2) may have a suitable diameter, for example, of one-sixteenth of an inch. The cantilevered pins 142(1), 142(2) may be attached to a structural member 101 of the splice connector installation tool 44. The cantilevered pins 142(1), 142(2) and the structural member 101 may be made of a strong resilient material, for example, plastic or steel.

It is noted that the second alignment member 84 and third alignment member 94 may together provide further alignment in additional axes, the first axis $A_1$ and third axis $A_3$, to maintain alignment between the optical fiber guide apparatus 42 and the end portion 52 of the fiber optic connector 46, to avoid misalignment from components of the force $F_0$ upon the optical fiber guide apparatus 42 in these axis, and to provide more robust alignment to account for manufacturing variances in component dimensions.

Figure 5A:
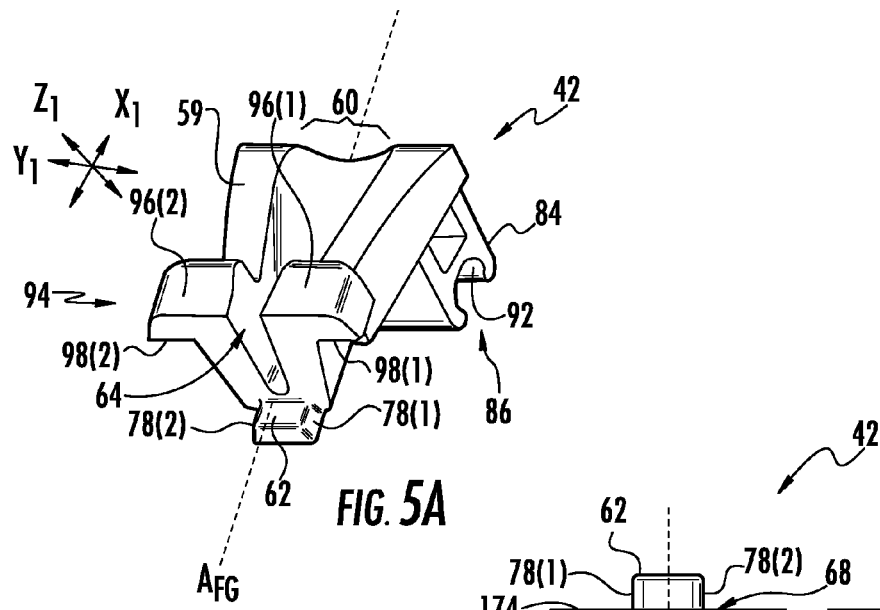
FIGS. 5A through 5E are perspective, top, front, rear side, and left side views, respectively, of the optical fiber guide apparatus of FIG. 2A.

FIG. 5A through 5E represent different views highlighting various features of the optical fiber guide apparatus 42. FIG. 5A shows a perspective view of the optical fiber guide apparatus 42 depicting the alignment member 62 including the two surfaces 78(1), 78(2). The two surfaces 78(1), 78(2) may be opposite to each other and may be tapered so that they become increasing closer to each other along a $Z_1$ axis perpendicular to the longitudinal axis $A_{FG}$ of the fiber guide. For clarity, the longitudinal axis $A_{FG}$ in FIGS. 5A through 5E is depicted as parallel to an $X_1$ axis.

FIG. 5A depicts the second alignment member 84. The second alignment member 84 includes the clip feature 86 configured to form the rotatable attachment 88 (FIG. 4A) with the splice connector installation tool 44. The clip feature 86 may include the concave surface 92. The concave surface 92 may deform during attachment with the splice connector installation tool 44 to allow the clip feature 86 to fit around the pin 138.

FIG. 5A also shows the third alignment member 94. The third alignment member 94 may include the alignment surfaces 98(1), 98(2) which may be symmetric about the longitudinal axis $A_{FG}$ of the fiber guide 60. The alignment surfaces 98(1), 98(2) may be disposed on brackets 96(1), 96(2) which extend away from the fiber guide 60. The brackets 96(1), 96(2) enable the alignment surfaces 98(1), 98(2) to contact the reference surfaces 100(1), 100(2) without becoming an obstacle to the end portion 52 of the fiber optic connector 46.

With continuing reference to FIGS. 5A through 5E, the fiber guide 60 may be integral to the alignment member 62, second alignment member 84, and third alignment member 94. This may reduce manufacturing expense by reducing the number of components and may reduce installation time by eliminating assembly tasks.

The fiber guide 60 may include the recess 64 which may guide the optical fiber 48 to the fiber entry 54 of the fiber optic connector 46 when the fiber optic connector 46 is mounted within the splice connector installation tool 44. The recess 64 may also define the exit opening 66 having the first cross-sectional area $CS_1$ and may be disposed on the first end 68 of the fiber guide 60. A width $D_4$ (FIG. 5D) of the exit opening 66 in one embodiment may have any suitable size, by way of example, $D_4$ may be about one (1) millimeter. The width $D_4$ of the exit opening 66 may be smaller than the width $D_1$ (FIG. 4A) of the fiber optic connector 46 to provide sufficient precision for the optical fiber 48 to enter the fiber entry 54. The first cross-sectional area $CS_1$ may have a curvilinear cross-sectional shape 160(1) (FIG. 5D) to avoid sharp corners that may catch the optical fiber 48 as the optical fiber 48 departs from the fiber guide 60. Also, the curvilinear cross-sectional shape 160(1) may facilitate the easier creation of smooth edges, otherwise sharp edges may damage the optical fiber 48 or be a ready source of debris to contaminate the optical fiber 48. The curvilinear cross-sectional shape 160(1) may also enable the recess 64 to be more easily cleaned to remove debris.

Figure 5B:
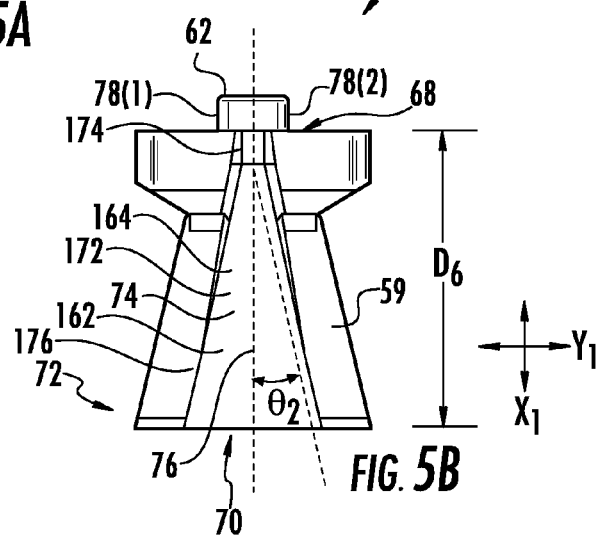
Figure 5C:
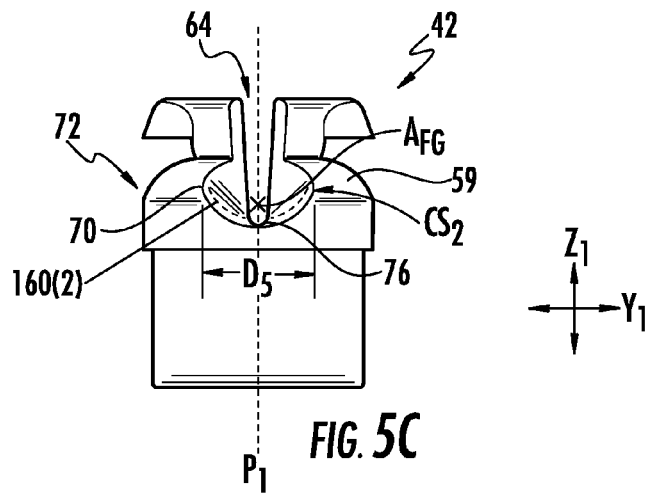
Figure 5D:
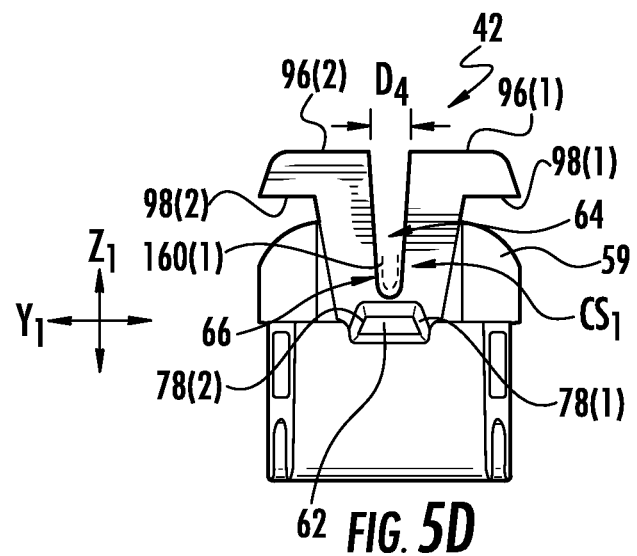
Figure 5E:
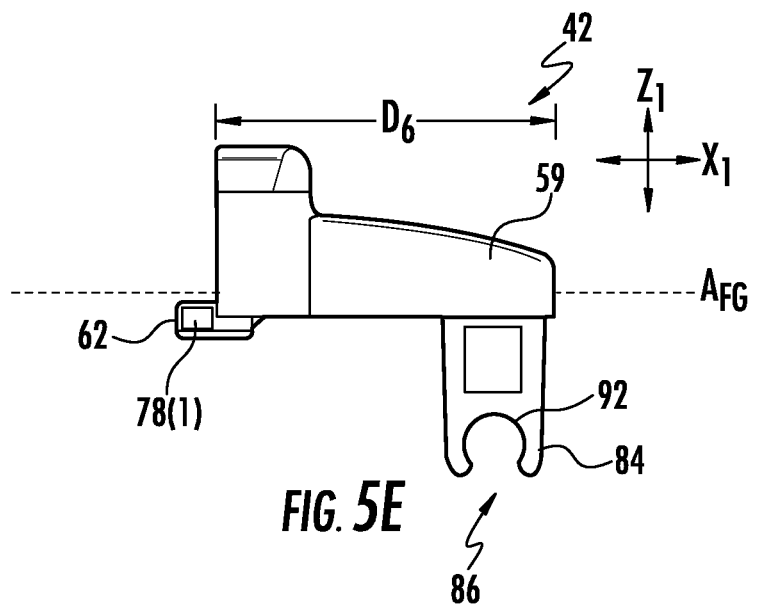

The fiber guide 60 may also include the entry opening 70 (FIG. 5C) which may permit the optical fiber 48 to enter the recess 64. The entry opening 70 may be disposed on the second end 72 of the fiber guide 60. The entry opening 70 may have the second cross-sectional area $CS_2$ having a width of $D_5$ (FIG. 5C) and a curvilinear cross-sectional shape 160(2) (FIG. 5C). The second cross-sectional area $CS_2$ may be larger than the first cross-sectional area $CS_1$ as the width $D_5$ may be larger than the width $D_4$.

The recess 64 may extend a distance $D_6$ (FIG. 5E) along the longitudinal axis $A_{FG}$. Embodiments of the recess 64 may include the distance $D_6$ no less than approximately five (5) millimeters long and no more than approximately twenty-five (25) millimeters long, as a non-limiting example. The distance $D_6$ (FIG. 5B) cannot be too short otherwise the width $D_4$ (FIG. 5D) of the exit opening 66 may be restricted by the width $D_1$ (FIG. 4A) of the fiber entry 54, a maximum theta ($\theta_2$) angle (FIG. 5B) to allow tolerable damage to the optical fiber 48 and tolerable debris generation, and the width $D_5$ (FIG. 5C) of the entry opening 70 to allow the optical fiber 48 to be easily inserted into the recess 64 of the fiber guide 60. The distance $D_6$ cannot be too long otherwise the optical fiber 48 may be more difficult to control at the first end 68 of the fiber guide 60 when the first end 68 becomes distant from the second end 72.

The recess 64 may include the one or more recess surfaces 74 which may be plated with a metallic plating material 162 to prevent the optical fiber 48 from stopping along the recess 64. The metallic plating material 162 allows an inexpensive material, for example, thermoplastic, to be used to manufacture a sub-surface of the fiber guide 60 to save manufacturing expense. In some embodiments, the optical fiber guide apparatus 42 may be wholly made of metal, for example, a nickel alloy or other suitable material.

Figure 6:
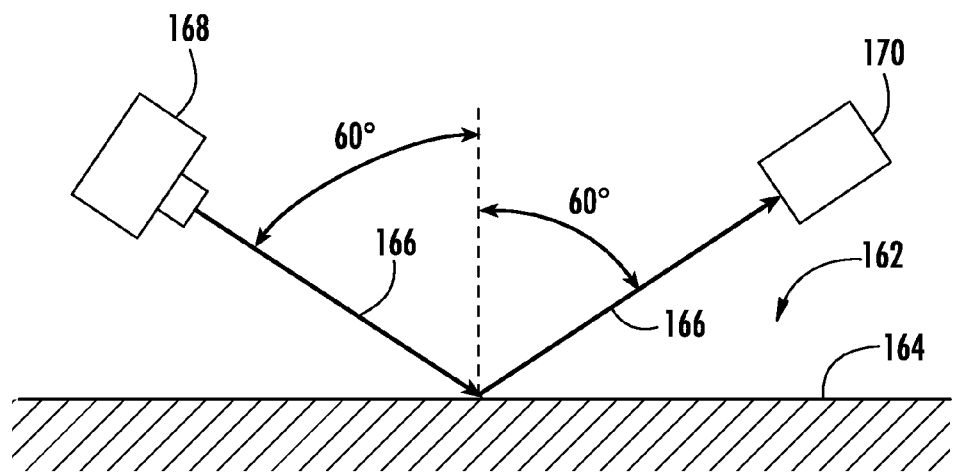
FIG. 6 is a side schematic conceptual view of an exemplary methodology for measuring the reflectivity of a plating material that may be used for the fiber guide of the optical fiber guide apparatus of FIG. 2A.

As stated, the optical fiber guide apparatus 42 may optionally be fully or at least partially plated with the metallic plating material 162. The metallic plating material 162 may be a matte-finish material 164 comprising nickel. As schematically illustrated in FIG. 6, the matte-finish material 164 may reflect no more than five (5) percent of a visual-light beam 166 radiating from a light source 168 reflected sixty (60) degrees from perpendicular to the matte-finish material 164 as measured by a light-intensity measurement device 170. The visual-light beam 166 may comprise electromagnetic radiation having a wavelength of more than 380 nanometers and less than 740 nanometers. An operator may be better able to insert the optical fiber 48 through the recess 64 and into the fiber entry 54 when the optical fiber 48 is easily seen. The optical fiber 48 is more easily seen against the matte-finish material 164 because the reduced glare from fewer reflections from the matte-finish material 164 provides a high contrast.

The matte-finish material 164 may also be a damage-resistant material 172 forming a surface configured to reduce or not cause debris when in abutment with the optical fiber 48. The debris may be caused when the optical fiber 48 scratches the matte-finish material 164. Debris may be generated when the optical fiber 48 contacts the matte-finish material 164 of the recess 64. The debris generation may be controlled by a number of factors including a hardness of the optical fiber 48 relative to the matte-finish material 164, and/or the geometry of the recess 64. The metallic plating material 162 may not have too low of a hardness compared to the optical fiber 48 or the metallic plating material 162 will easily deform upon contact with the optical fiber 48 and cause debris. The optical fiber 48 may have a Mohs scale of about seven (7) and the metallic plating material 162 may have a Mohs scale of about four (4). The relative hardness of the metallic plating material 162 discourages the generation of debris upon contact with the optical fiber 48.

The rate of debris generation may be low at an angle of attack of zero (0) degrees when the optical fiber is parallel to the metallic plating material 162 of the recess 64. However, as the optical fiber 48 approaches a position perpendicular to the metallic plating material 162, when the angle of attack becomes ninety (90) degrees, the rate of debris generation increases. Tables 1A and 1B shown below depict empirical data showing observations of debris generation and the optical fiber 48. In Tables 1A and 1B, seven (7) different optical fibers 48 were used for seven different angles of attack from ten (10) degrees to seventy (70) degrees to contact or "strike" the metallic plating material 162. Each of the seven different optical fibers 48 experienced five (5) cycles of strikes to the metallic plating material 162 at a given angle of attack. Observations were recorded during each cycle in Table 1A (Examples of Conditions of Optical Fiber and Level of Debris For Angles of Attack From Ten (10) to Forty (40) Degrees) or Table 1B (Examples of Conditions of Optical Fiber and Level of Debris For Angles of Attack From Fifty (50) to Seventy (70) Degrees) regarding the damage to the optical fiber 48 and the recess 64, and the debris generated each cycle. Also, at the beginning of each cycle the optical fiber 48 was cleaved and both recess 64 and the optical fiber 48 cleaned. The empirical data shows that angles of attack less than twenty (20) degrees have minimum debris generation and minimum damage to the optical fiber 48.

TABLE 1A

Examples of Conditions of Optical Fiber and Level of Debris
For Angles of Attack From Ten (10) to Forty (40) Degrees

| | Condition of Optical Fiber and Level of Debris For Each Angle of Attack | | | |
|---|---|---|---|---|
| Optical Fiber Strikes | 10 Degrees | 20 Degrees | 30 Degrees | 40 Degrees |
| First | No change | Debris about ½ radius inward and about ½ radius width | Small deposit ⅓ of radius | Debris scattered across one side |

TABLE 1A-continued

Examples of Conditions of Optical Fiber and Level of Debris
For Angles of Attack From Ten (10) to Forty (40) Degrees Condition of Optical Fiber and Level of Debris
For Each Angle of Attack

| Optical Fiber Strikes | 10 Degrees | 20 Degrees | 30 Degrees | 40 Degrees |
|---|---|---|---|---|
| Second | Small deposit of debris added from edge to ¼ radius | Debris with small width but extends ⅚ of the way to core | Small deposit ½ of radius | Large deposit about ⅔ radius inward |
| Third | Small deposit of debris added from edge to ¼ radius | Small debris ½ radius inward | Small deposit ½ of radius | Large amount of debris scattered across surface |
| Fourth | Small deposit of debris added from edge to ⅓ radius | Large deposit with string of powder across fiber | Small deposit ⅓ of radius | Large deposit ½ radius inward |
| Fifth | Small deposit of debris added from edge to ½ radius | Small debris ½ radius inward | 2 large deposits with debris scattered across radial surface | Large deposit almost to core and scattered across radial |
| Observations of fiber guide before first optical fiber strike | Has scratches from rear top diagonal toward front bottom | Vertical scratches from mold line to top | No scratches | Scratches across top of front end |
| Observations of fiber guide after fifth optical fiber strike | No discernable change | No discernable change | No discernable change | 2.5 scratches cross the midsection, most likely from same fiber |

TABLE 1B

Examples of Conditions of Optical Fiber and Level of Debris
For Angles of Attack From Fifty (50) to Seventy (70) Degrees Condition of Optical Fiber and Level of Debris
for Each Angle of Attack

| Optical Fiber Strikes | 50 Degrees | 60 Degrees | 70 Degrees |
|---|---|---|---|
| First | Debris scattered all the way to core and across radially | Debris deposit to center of fiber and small deposit across | ½ of fiber destroyed |
| Second | Small deposit ½ radius inward | Destroyed across entire fiber with large deposit on one end | ⅓ destroyed |
| Third | Piece of fiber missing, debris scattered to core | ⅓ of fiber destroyed | Large area of debris with small deposit across |
| Fourth | Small deposit ⅔ radius inward with tiny deposit adjacent | A little more destroyed than third cleave | Debris all around surface of fiber |
| Fifth | Large deposit inward to core | Nearly ½ of fiber destroyed | ½ of fiber destroyed inwardly with radial surface damage |
| Observations of fiber guide before first optical fiber strike | Large diagonal scratch at top | Divot at rear mid; scratches extend from front diagonally | Vertical scratches at front |
| Observations of fiber guide after fifth optical fiber strike | No discernable change | Multiple scratches across in two different places | Multiple scratches were fibers stuck to device |

Using the information from Tables 1A and 1B, it can be observed that a smaller angle of attack reduces debris and optical fiber damage. In this regard, as a non-limiting example, the recess 64 may include the one or more recess surfaces 74 disposed up to twenty (20) degrees from the longitudinal axis $A_1$ of the splice connector installation tool 44, but other angles are possible. FIGS. 5B and 5C illustrates an exemplary angular measurement of the recess surfaces 74 as the angle theta ($\theta_2$) from a longitudinal axis $A_{FG}$ of the fiber guide 60. The longitudinal axis $A_{FG}$ enters the recess 64 at the entry opening 70 and exits the recess 64 at the exit opening 66. When the fiber guide 60 is aligned with the splice connector installation tool 44, then the axis $A_1$ and the longitudinal axis $A_{FG}$ are aligned as depicted in FIG. 4A. The recess surfaces 74 may be disposed within fifteen (15) degrees of the axis $A_1$ to further reduce debris and damage to the optical fiber 48, as another non-limiting example. However, not every portion of the recess surfaces 74 may have the same angular disposition to the longitudinal axis $A_{FG}$ in this embodiment. In other words, compound surfaces/angles are possible with the concepts disclosed. When axis $A_1$ is aligned with longitudinal axis $A_{FG}$ then the detachable optical fiber guide apparatus is aligned with the splice connector installation tool 44. For example, in FIG. 5B a portion 174 of recess surfaces 74 may be parallel (0 degrees) to the axis $A_{FG}$, yet portion 176 of the recess surfaces 74 may be fifteen (15) degrees to the axis $A_{FG}$. The difference in angular orientation reduces debris generation near the exit opening 66 which may be nearest the end portion 52 of the fiber optic connector 46.

Moreover, with continuing reference to FIGS. 5A through 5E, the recess surfaces 74 may include the bottom recess surface portion 76 (FIG. 5C) disposed up to four (4) degrees from the axis $A_1$ of the splice connector installation tool 44, or preferably up to two (2) degrees, as non-limiting examples. In embodiments where the recess surfaces 74 may have the cross sections $CS_1$, $CS_2$ in the curvilinear cross-sectional shapes 160(1), 160(2) (FIGS. 5D and 5C respectively) then the bottom recess surface portion 76 is a portion of the recess surfaces 74 that is within a vertical geometric plane $P_1$ (see FIG. 5C) coincident with the axis $A_{FG}$. The angular orientation of the bottom recess surface portion 76 may limit the change in vertical direction (Z) experienced by the optical fiber 48. This angular orientation also makes it easier for the optical fiber 48 to be inserted into the fiber entry 54 by reducing an opportunity to misalign the optical fiber 48 vertically with respect to the fiber entry 54.

Figure 7:
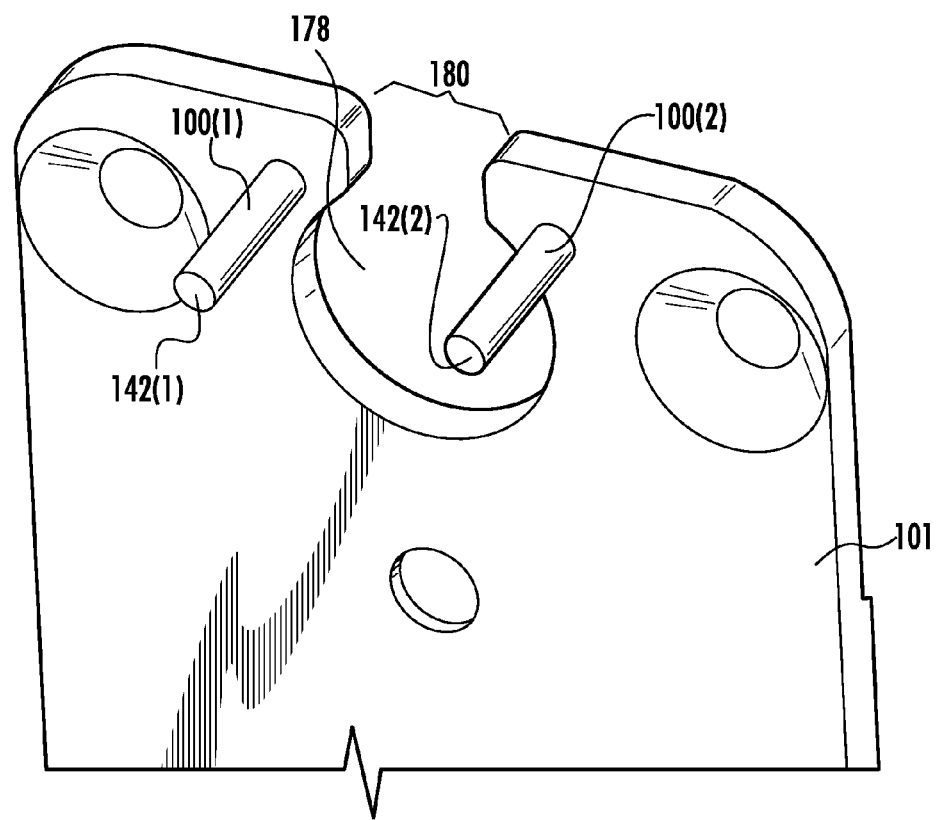
FIG. 7 is a perspective view of exemplary cantilevered pins attached to a structural member of the splice connector installation tool of FIG. 2A.
Figure 7:
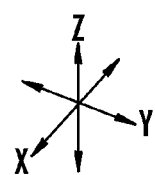

After the optical fiber 48 is inserted into the fiber entry 54, then the optical fiber 48 may be terminated with the stub optical fiber 116 of the fiber optic connector 46. FIG. 7 shows details of the structural member 101 of the splice connector installation tool 44 which may enable the insertion and termination. The cantilevered pins 142(1), 142(2) including the reference surfaces 100(1), 100(2) may be attached to the structural member 101. The structural member 101 may be disposed between the cam actuator 108 and the housing opening 58. Between the cantilevered pins 142(1), 142(2) may be an orifice 178 enabling the end portion 52 of the fiber optic connector 46 to be accessible to enable insertion of the optical fiber 48. The structural member 101 also may include an opening 180 to remove the fiber optic connector 46 after the optical fiber 48 may be terminated to the stub optical fiber 116 of the fiber optic connector 46.

It is noted that symmetrical elements 78, 96, 98, 100, 134, 142, 160, $F_1$, and $F_2$ are shown in the embodiment shown, for example, in FIGS. 2A through 2B, 4B through 5E, 7, 9 through 10, and 12B, but other embodiments could also include one, or more than two of these elements.

Figure 8:
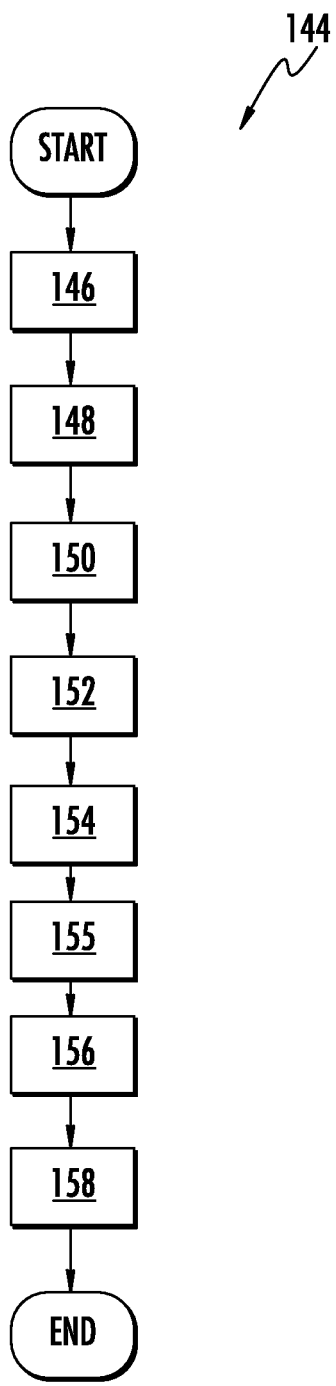
FIG. 8 illustrates an exemplary process for splicing an optical fiber to a stub optical fiber of a fiber optic connector using the splice connector installation tool and optical fiber guide apparatus of FIG. 2A.

FIG. 8 provides an exemplary process 144 for splicing the optical fiber 48 to the stub optical fiber 116 of the fiber optic connector 46 consistent with the splice connector installation tool 44 and the optical fiber guide apparatus 42 as shown in FIGS. 2A through 5E. The process in FIG. 8 will be described in conjunction with FIGS. 2A, 2B, 4A, and 9 through 12B. As shown in FIGS. 2A and 2B, the first step of the process 144 may include providing the splice connector installation tool 44 including the housing 102 forming the internal cavity 112 (step 146 in FIG. 8). The splice connector installation tool 44 may also include the mechanical device 114 at least partially disposed within the internal cavity 112.

With continuing reference to FIGS. 2A and 2B, the optical fiber guide apparatus 42 may also include the fiber guide 60 comprising the recess 64 defining the entry opening 70 and the exit opening 66 opposite the entry opening 70 along the longitudinal axis $A_1$ of the fiber guide 60 (step 148 in FIG. 8). The optical fiber guide apparatus 42 may include the alignment member 62.

Figure 9:
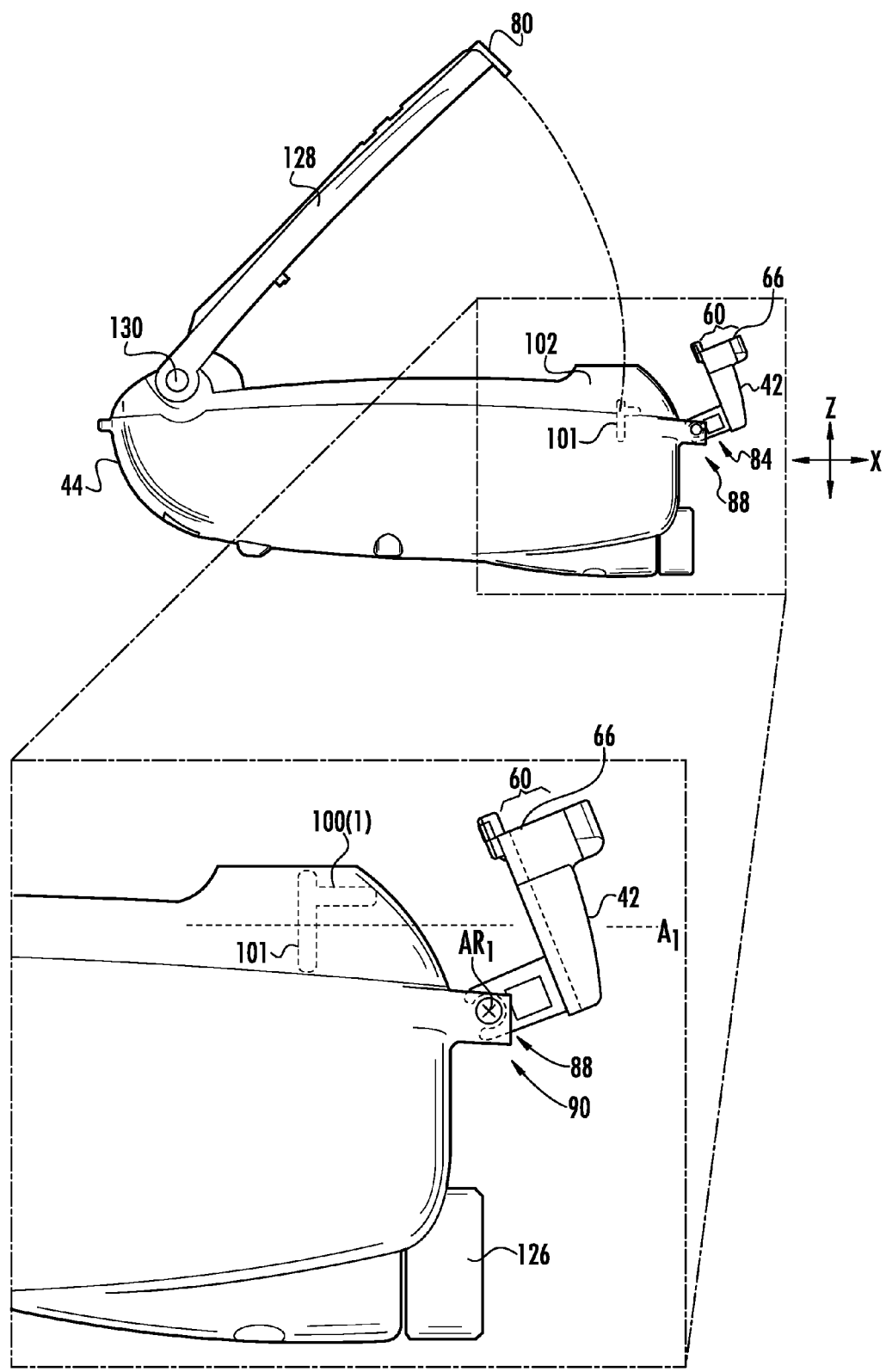
FIG. 9 is a side view of the optical fiber guide apparatus of FIG. 2A installed on the splice connector installation tool of FIG. 2A along with a detail view.

Next, as shown in FIG. 9, the exit opening 66 of the fiber guide 60 may be aligned along the longitudinal axis $A_1$ of the splice connector installation tool 44 using the second alignment member 84 of the optical fiber guide apparatus 42 (step 150 in FIG. 8). This alignment created by the second alignment member 84 defines a maximum distance along the longitudinal axis $A_1$ that the exit opening 66 can be located away from the axis of rotation $AR_1$ to prevent the optical fiber guide apparatus from obstructing the end portion 52 of the fiber optic connector 46. The second alignment member 84 may include the clip feature 86 forming a rotatable attachment 88 with the splice connector installation tool 44. The rotatable attachment 88 may be a slidable pivot attachment 90.

Figure 10:
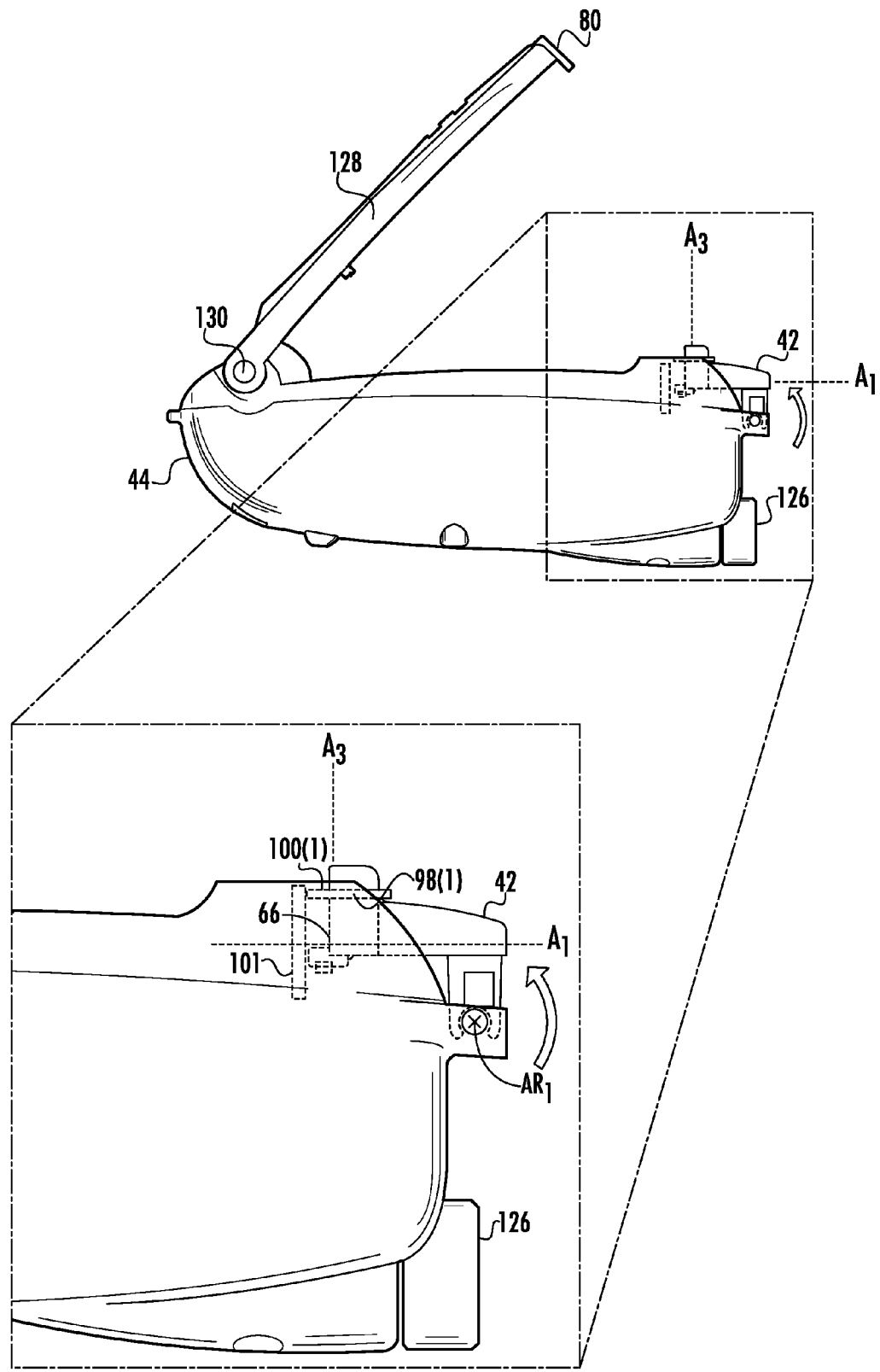
FIG. 10 is a side view of the optical fiber guide apparatus of FIG. 9 pivoted to abut against at least one reference surface of the splice connector installation tool of FIG. 2A along with a detail view.

Next, as shown in FIG. 10, the exit opening 66 of the fiber guide 60 may be aligned along the third axis $A_3$ by using the third alignment member 94 of the optical fiber guide apparatus 42 (step 152 in FIG. 8). The third alignment member 94 may align by abutting the alignment surfaces 98(1), 98(2) of the third alignment member 94 against the reference surfaces 100(1), 100(2) of the splice connector installation tool 44. The reference surfaces 100(1), 100(2) may be disposed on the cantilevered pins 142(1), 142(2) which are at least partially disposed within the housing opening 58.

Figure 11:
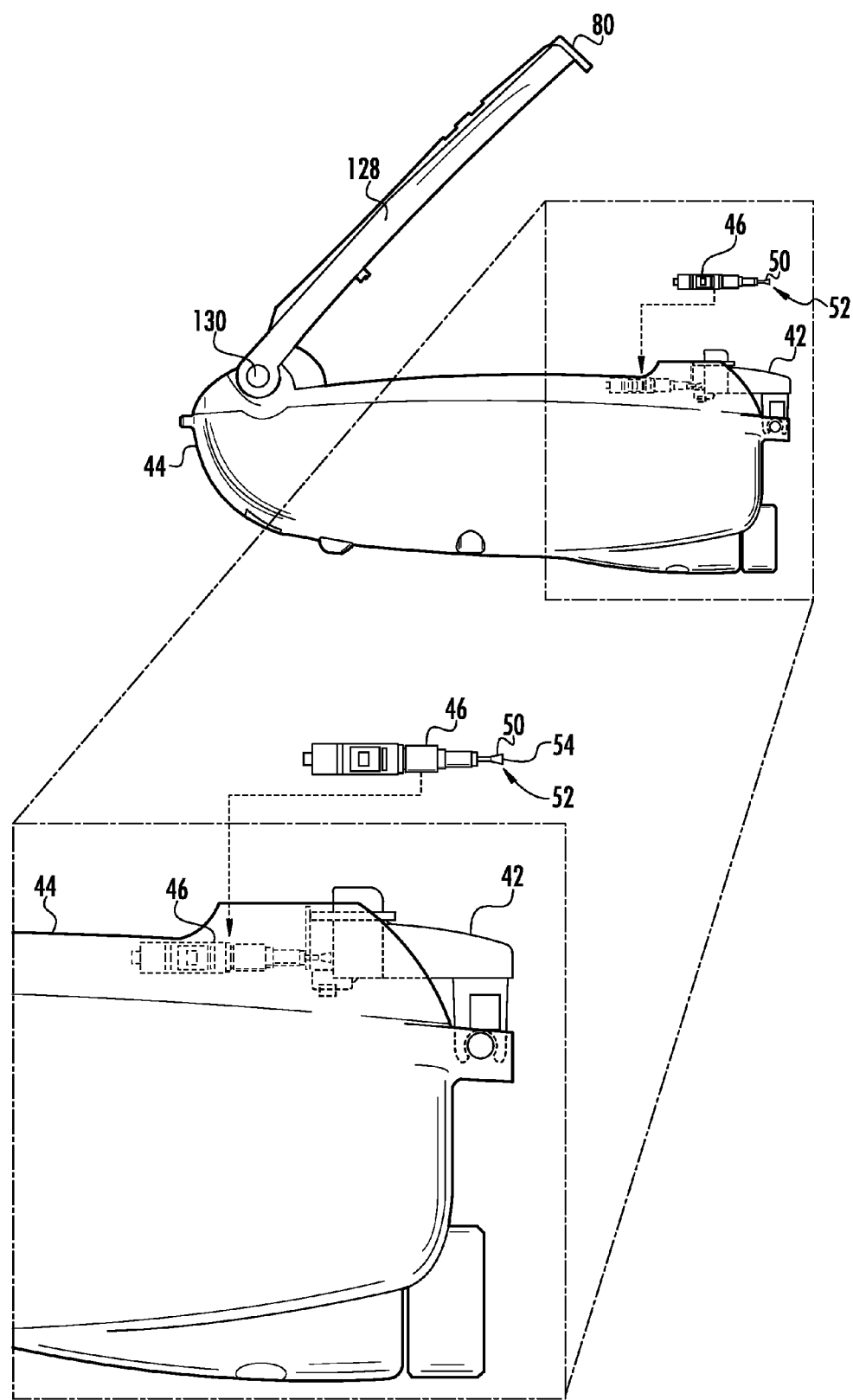
FIG. 11 is a side view of the optical fiber guide apparatus and splice connector installation tool of FIG. 10 with the fiber optic connector installed in the splice connector installation tool along with a detail view.

Next, as shown in FIG. 11, the fiber optic connector 46 which includes the end portion 52 may be installed into the splice connector installation tool 44 (step 154 in FIG. 8). The fiber optic connector 46 may be conventionally attached in a manner allowing for movement in the second axis $A_2$. The lid 128 may be open as the fiber optic connector 46 is attached.

Figure 12A:
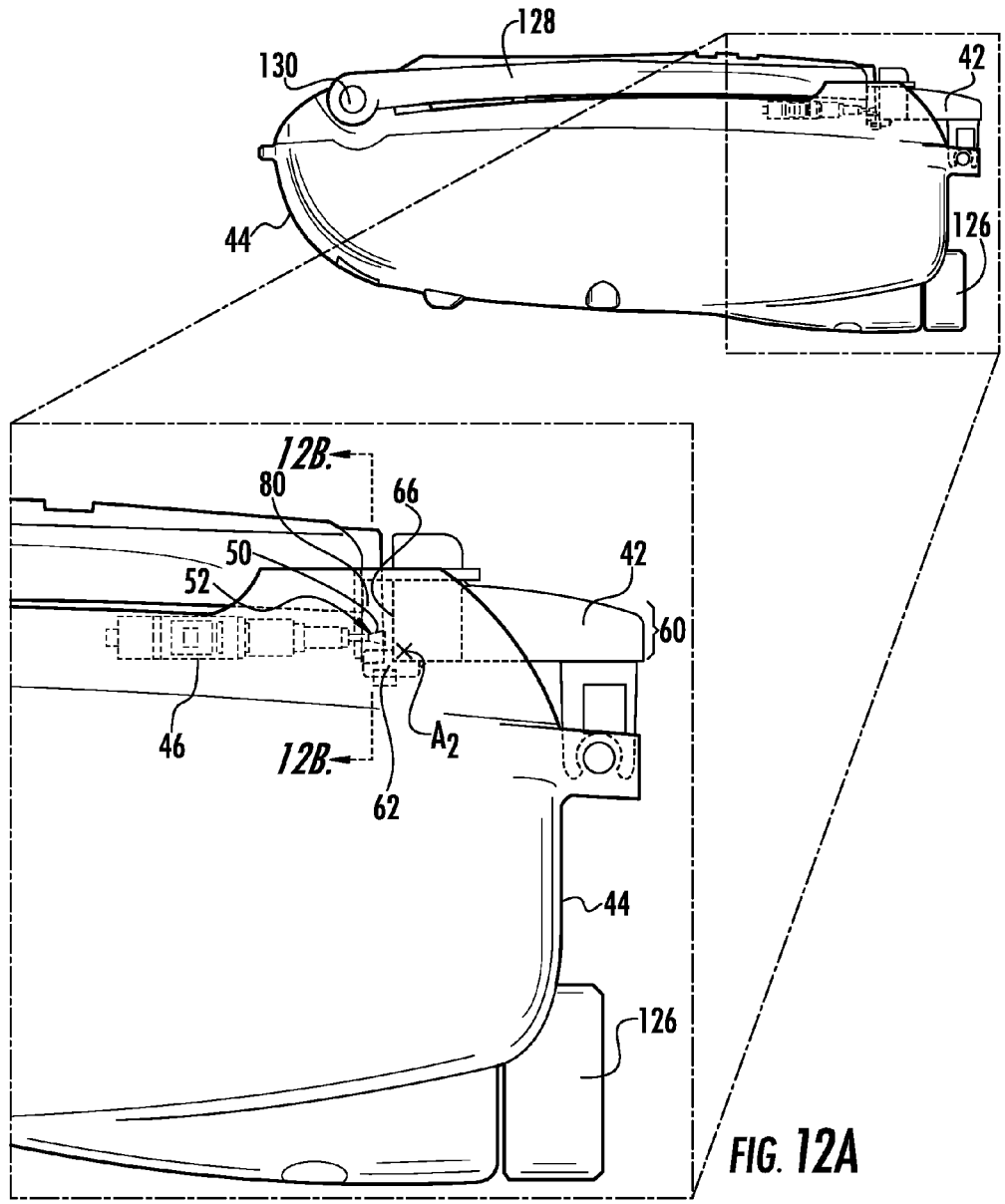
FIGS. 12A and 12B are a side view and a partial front cutaway view, respectively, of the optical fiber guide apparatus and splice connector installation tool of FIG. 11 with the movable clamp clamping on the end portion and alignably interfacing with the adjustment feature of the optical fiber guide apparatus.
Figure 12B:
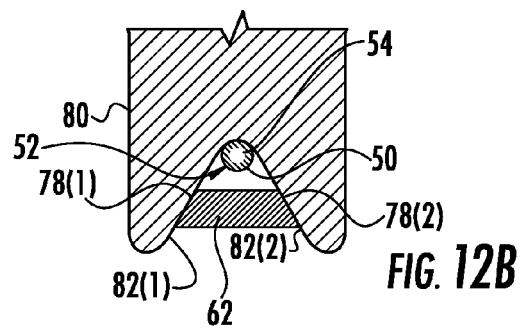

Next as shown in FIG. 12A, the exit opening 66 of the fiber guide 60 may be aligned in the second axis $A_2$ with the alignment member 62 by alignably interfacing the alignment member 62 with the movable clamp 80 movably attached to the splice connector installation tool 44 as the movable clamp 80 clamps the end portion 52 of the fiber optic connector 46 (step 155 in FIG. 8). As shown in FIG. 12B, the two surfaces 78(1), 78(2) of the alignment member 62 may abut against the movable clamp 80 as the movable clamp 80 clamps the end portion 52. The two surfaces 78(1), 78(2) may be tapered and the movable clamp 80 may pivot from the splice connector installation tool 44. The exit opening 66 may now be aligned with the end portion 52 of the fiber optic connector 46 with respect to the longitudinal axis $A_1$, the axis $A_2$, and the axis $A_3$.

Next, as shown in FIG. 4A, the optical fiber 48 may be received into the entry opening 70 and the optical fiber 48 guided along the longitudinal axis $A_1$ of the fiber guide 60 through the exit opening 66 into a housing opening 58 of the splice connector installation tool 44 (step 156 in FIG. 8). The optical fiber 48 may strike the one or more recess surfaces 74 of the fiber guide 60 as the optical fiber 48 may be guided along the longitudinal axis $A_1$.

Lastly, the optical fiber 48 may be terminated to the stub optical fiber 116 of the fiber optic connector 46 using the mechanical device 114 (step 158 in FIG. 8). The optical fiber 48 may be inserted through the end portion 52 of the fiber optic connector 46 until the optical fiber 48 is at least in the proximity of the stub optical fiber 116. At least a portion of the fiber optic connector 46 may be moved by the mechanical device 114 to optically couple the optical fiber 48 to the stub optical fiber 116.

The connector installation tool, the detachable optical fiber guide apparatus, and methods described herein to insert and guide the optical fiber to the stub fiber within the fiber optic connector installed within the splice connector installation tool are applicable to any pair of interconnected optical fibers, and more particularly, between a field optical fiber and an optical fiber of any fiber optic splice connector, including a single fiber or multi-fiber fusion splice or mechanical splice connector. Examples of typical single fiber mechanical splice connectors are provided in U.S. Pat. Nos. 4,755,018; 4,923,274; 5,040,867; and 5,394,496. Examples of typical multi-fiber mechanical splice connectors are provided in U.S. Pat. Nos. 6,173,097; 6,379,054; 6,439,780; and 6,816,661.

As used herein, it is intended that the terms "fiber optic cables" and/or "optical fibers" include all types of single mode and multi-mode light waveguides, including one or more optical fibers that may be up-coated, colored, buffered, ribbonized and/or have other organizing and/or protective structures in a cable, such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multi-mode fiber commercially available from Corning Incorporated of Corning, N.Y. Suitable fibers of this type are disclosed, for example, in U.S. Patent Application Publication Nos. 2008/0166094 and 2009/0169163, the disclosures of which are incorporated herein by reference in their entireties.

Many modifications and other embodiments not set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An optical fiber guide apparatus configured to guide an optical fiber into a fiber optic connector installed within a splice connector installation tool, comprising:
a fiber guide body;
a fiber guide disposed in the fiber guide body, the fiber guide comprising a recess defining an entry opening and an exit opening opposite the entry opening along a longitudinal axis of the fiber guide, the recess configured to receive and guide an optical fiber from the entry opening along the longitudinal axis of the fiber guide through the exit opening into a housing opening of a splice connector installation tool; and
an alignment member disposed in the fiber guide body, the alignment member configured to be alignably interfaced with a movable clamp attached to the splice connector installation tool, the movable clamp configured to clamp an end portion of a fiber optic connector within the housing opening for aligning the end portion with the exit opening of the fiber guide;
wherein the alignment member is configured to align the exit opening of the fiber guide disposed in the fiber guide body along a second axis orthogonal to a longitudinal axis of the splice connector installation tool; and
wherein the alignment member includes at least one of two surfaces configured to abut against the movable clamp.

2. The optical fiber guide apparatus of claim 1, wherein each of the at least two surfaces is tapered.

3. The optical fiber guide apparatus of claim 1, further comprising a second alignment member configured to limit a position of the exit opening of the fiber guide along the longitudinal axis of the splice connector installation tool.

4. The optical fiber guide apparatus of claim 3, wherein the second alignment member comprises a clip feature configured to form a rotatable attachment with the splice connector installation tool.

5. The optical fiber guide apparatus of claim 4, wherein the rotatable attachment includes a slidable pivot attachment.

6. The optical fiber guide apparatus of claim 5, wherein the clip feature includes a concave surface configured to form the slidable pivot attachment.

7. The optical fiber guide apparatus of claim 3, further comprising a third alignment member configured to position the exit opening of the fiber guide along a third axis, and the third axis is orthogonal to the longitudinal axis of the splice connector installation tool and orthogonal to the second axis.

8. The optical fiber guide apparatus of claim 7, wherein the third alignment member comprises at least one alignment surface configured to align the exit opening of the fiber guide along the third axis by abutting against at least one reference surface attached to the splice connector installation tool.

9. The optical fiber guide apparatus of claim 8, wherein the at least one alignment surface includes two alignment surfaces that are symmetrical about the longitudinal axis of the fiber guide.

10. An optical fiber termination system, comprising:
a splice connector installation tool comprising:
a housing forming an internal cavity; and
a mechanical device at least partially disposed within the internal cavity configured to perform a splice termination of an optical fiber and a stub optical fiber of a fiber optic connector; and
an optical fiber guide apparatus comprising:
a fiber guide body;
a fiber guide disposed in the fiber guide body, the fiber guide comprising a recess defining an entry opening and an exit opening opposite the entry opening along a longitudinal axis of the fiber guide, the recess configured to receive and guide the optical fiber from the entry opening along the longitudinal axis of the fiber guide through the exit opening into a housing opening of the splice connector installation tool; and
an alignment member disposed in the fiber guide body, the alignment member alignably interfacing with a movable clamp attached to the splice connector installation tool, the movable clamp clamping an end portion of the fiber optic connector within the housing opening to align the end portion with the exit opening of the fiber guide;
wherein the alignment member aligns the exit opening of the fiber guide disposed in the fiber guide body along a second axis orthogonal to a longitudinal axis of the splice connector installation tool;
wherein the alignment member includes at least one of two surfaces abutting against the movable clamp.

11. The optical fiber guide apparatus of claim 10, wherein each of the at least two surfaces is tapered.

12. The optical fiber guide apparatus of claim 10, wherein the moveable clamp is pivotably attached to the splice connector installation tool.

13. The optical fiber guide apparatus of claim 10, further comprising a second alignment member limiting a position of the exit opening of the fiber guide along the longitudinal axis of the splice connector installation tool.

14. The optical fiber guide apparatus of claim 13, wherein the second alignment member comprises a clip feature forming a rotatable attachment with the splice connector installation tool.

15. The optical fiber guide apparatus of claim 14, wherein the rotatable attachment includes a slidable pivot attachment.

16. The optical fiber guide apparatus of claim 15, wherein the clip feature comprises a concave surface forming the slidable pivot attachment to a curved surface attached as part of the splice connector installation tool.

17. The optical fiber guide apparatus of claim 16, wherein the curved surface is disposed on a cylindrical pin attached as part of the splice connector installation tool.

18. The optical fiber guide apparatus of claim 13, further comprising a third alignment member aligning the exit opening of the fiber guide along a third axis, and the third axis is orthogonal to the longitudinal axis of the splice connector installation tool and orthogonal to the second axis.

19. The optical fiber guide apparatus of claim 18, wherein the third alignment member comprises at least one alignment surface aligning the exit opening of the fiber guide along the third axis by abutting against at least one reference surface attached as part of the splice connector installation tool.

20. The optical fiber guide apparatus of claim 19, wherein the at least one reference surface is disposed on at least one cantilevered pin of the splice connector installation tool that is disposed within the housing opening.

21. A method for splicing an optical fiber to a stub optical fiber in a fiber optic connector, comprising:
providing a splice connector installation tool including a housing forming an internal cavity, and a mechanical device at least partially disposed within the internal cavity;
providing an optical fiber guide apparatus comprising a fiber guide body and a fiber guide disposed in the fiber guide body, the fiber guide including a recess defining an entry opening and an exit opening opposite the entry opening along a longitudinal axis of the fiber guide, and the optical fiber guide apparatus includes an alignment member disposed in the fiber guide body;
aligning the exit opening of the fiber guide in a direction relative to the splice connector installation tool with the alignment member by alignably interfacing the alignment member with a movable clamp attached to the splice connector installation tool as the movable clamp clamps an end portion of a fiber optic connector;
receiving an optical fiber into the entry opening and guiding the optical fiber along the longitudinal axis of the fiber guide through the exit opening into a housing opening of the splice connector installation tool; and
terminating the optical fiber to a stub optical fiber of the fiber optic connector using the mechanical device;
wherein in the aligning the exit opening of the fiber guide disposed in the fiber guide body with the alignment member, the aligning in the direction relative to the splice connector installation tool is along a second axis orthogonal to a longitudinal axis of the splice connector installation tool; and
wherein in the alignably interfacing the alignment member, at least one of two surfaces abut against the movable clamp.

22. The method of claim 21, wherein in the alignably interfacing the alignment member, each of the at least one of two surfaces is tapered.

23. The method of claim 22, wherein in the alignably interfacing the alignment member, the movable clamp pivots from the splice connector installation tool.

24. The method of claim 21, further comprising aligning the exit opening of the fiber guide along the longitudinal axis of the splice connector installation tool using a second alignment member of the optical fiber guide apparatus.

25. The method of claim 24, wherein in the aligning the exit opening of the fiber guide along the longitudinal axis of the splice connector installation tool, the using the second alignment member comprises a clip feature forming a rotatable attachment with the splice connector installation tool.

26. The method of claim 24, further comprising aligning the exit opening of the fiber guide along a third axis by using a third alignment member of the optical fiber guide apparatus, and the third axis is orthogonal to the longitudinal axis of the splice connector installation tool and orthogonal to the second axis.

27. The method of claim 26, wherein the using the third alignment member includes at least one alignment surface of the third alignment member abutting against at least one reference surface of the splice connector installation tool.

28. The method of claim 27, wherein in the abutting against the at least one reference surface, the at least one reference surface is disposed on at least one cantilevered pin disposed at least partially within the housing opening.

* * * * *